(12) United States Patent
Cha et al.

(10) Patent No.: US 12,184,576 B2
(45) Date of Patent: Dec. 31, 2024

(54) METHOD FOR TRANSMITTING/RECEIVING SIGNAL IN WIRELESS COMMUNICATION SYSTEM AND DEVICE SUPPORTING SAME

(71) Applicant: LG ELECTRONICS INC., Seoul (KR)

(72) Inventors: Hyunsu Cha, Seoul (KR); Byounghoon Kim, Seoul (KR); Kijun Kim, Seoul (KR); Sukhyon Yoon, Seoul (KR); Hyunsoo Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 322 days.

(21) Appl. No.: 17/634,919

(22) PCT Filed: Aug. 14, 2020

(86) PCT No.: PCT/KR2020/095105
§ 371 (c)(1),
(2) Date: Feb. 11, 2022

(87) PCT Pub. No.: WO2021/029759
PCT Pub. Date: Feb. 18, 2021

(65) Prior Publication Data
US 2022/0286254 A1 Sep. 8, 2022

Related U.S. Application Data

(60) Provisional application No. 62/886,954, filed on Aug. 14, 2019.

(51) Int. Cl.
*H04L 5/00* (2006.01)
*H04W 56/00* (2009.01)

(52) U.S. Cl.
CPC ......... *H04L 5/0051* (2013.01); *H04W 56/001* (2013.01)

(58) Field of Classification Search
None
See application file for complete search history.

(56) References Cited

U.S. PATENT DOCUMENTS

| 2012/0040685 | A1* | 2/2012 | Escolar-Piedras | ........ G01S 5/10 455/456.1 |
| 2015/0270936 | A1* | 9/2015 | Han | ...................... H04L 5/0035 370/329 |

(Continued)

FOREIGN PATENT DOCUMENTS

| KR | 10-20170084250 | 7/2017 |
| KR | 10-2018-0018237 | 2/2018 |
| KR | 10-20190039130 | 4/2019 |

OTHER PUBLICATIONS

PCT International Application No. PCT/KR2020/095105, International Search Report dated Nov. 25, 2020, 5 pages.

(Continued)

*Primary Examiner* — Otis L Thompson, Jr.
(74) *Attorney, Agent, or Firm* — LEE, HONG, DEGERMAN, KANG & WAIMEY

(57) ABSTRACT

Various embodiments of the present disclosure relate to a next-generation wireless communication system for supporting a higher data transmission rate beyond a 4th generation (4G) wireless communication system. According to various embodiments of the present disclosure, a method for transmitting/receiving a signal in a wireless communication system and a device supporting same may be provided.

12 Claims, 25 Drawing Sheets

(56) References Cited

U.S. PATENT DOCUMENTS

| | | | |
|---|---|---|---|
| 2016/0205499 A1* | 7/2016 | Davydov | G01S 5/0236 |
| | | | 455/456.1 |
| 2016/0345229 A1* | 11/2016 | Das | H04W 36/302 |
| 2017/0289953 A1* | 10/2017 | Chae | G01S 1/20 |
| 2018/0054699 A1* | 2/2018 | Edge | H04W 4/02 |
| 2018/0302873 A1* | 10/2018 | Kazmi | H04W 24/10 |
| 2019/0104431 A1 | 4/2019 | Gunnarsson et al. | |
| 2019/0369201 A1* | 12/2019 | Akkarakaran | G01S 5/10 |
| 2019/0387409 A1* | 12/2019 | Thangarasa | H04W 16/00 |
| 2020/0264261 A1* | 8/2020 | Akkarakaran | H04L 5/0051 |
| 2020/0322756 A1* | 10/2020 | Sosnin | H04W 4/029 |
| 2021/0014644 A1* | 1/2021 | Wu | G01S 5/0205 |
| 2021/0341562 A1* | 11/2021 | Ernström | G01S 5/0236 |

OTHER PUBLICATIONS

Zte et al., "Discussion on physical-layer procedure for NR positioning," R1-1906427, 3GPP TSG RAN WG1 #97, May 2019, 7 pages.

* cited by examiner (a)

(b)

METHOD FOR TRANSMITTING/RECEIVING SIGNAL IN WIRELESS COMMUNICATION SYSTEM AND DEVICE SUPPORTING SAME

CROSS-REFERENCE TO RELATED APPLICATIONS

This application is the National Stage filing under 35 U.S.C. 371 of International Application No. PCT/KR2020/095105, filed on Aug. 14, 2020, which claims the benefit of U.S. Provisional Application No. 62/886,954, filed on Aug. 14, 2019, the contents of which are hereby incorporated by reference herein in their entirety.

TECHNICAL FIELD

Various embodiments of the present disclosure relate to a wireless communication system.

BACKGROUND ART

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

DISCLOSURE

Technical Problem

Various embodiments of the present disclosure may provide a method of transmitting and receiving a signal in a wireless communication system and apparatus for supporting the same.

For example, various embodiments of the present disclosure may provide a positioning method in a wireless communication system and apparatus for supporting the same.

For example, various embodiments of the present disclosure may provide a method of reporting a plurality of measurements based on a plurality of reference signals (RSs) in a wireless communication system and apparatus for supporting the same.

It will be appreciated by persons skilled in the art that the objects that could be achieved with the various embodiments are not limited to what has been particularly described hereinabove and the above and other objects that the various embodiments could achieve will be more clearly understood from the following detailed description.

Technical Solution

Various embodiments of the present disclosure may provide a method of transmitting and receiving a signal in a wireless communication system and apparatus for supporting the same.

According to various embodiments of the present disclosure, a method performed by a user equipment (UE) in a wireless communication system may be provided.

In an exemplary embodiment, the method may include: receiving a first downlink (DL) reference signal (RS) and a second DL RS; obtaining a first measurement related to positioning based on the first DL RS; reporting information on the first measurement; obtaining a second measurement related to the positioning based on the second DL RS; and reporting information on a difference between the second measurement and the first measurement.

In an exemplary embodiment, the difference may be greater than or equal to 0.

In an exemplary embodiment, the first DL RS and the second DL RS may be received based on one or more RS resources with same quasi co-location (QCL) type D among different RS resources.

In an exemplary embodiment, each of the first measurement and the second measurement may be a measurement for a reception-transmission (RX-TX) time difference.

In an exemplary embodiment, the method may further include reporting information on a time stamp.

In an exemplary embodiment, the information on the time stamp may be related to the first measurement and the second measurement.

In an exemplary embodiment, the information on the time stamp may include information on a difference between a time at which the first measurement is obtained and a time at which the second measurement is obtained.

In an exemplary embodiment, the first DL RS may be a synchronization signal block (SSB), a channel state information reference signal (CSI-RS), or a positioning reference signal (PRS).

In an exemplary embodiment, the second DL RS may be a PRS.

In an exemplary embodiment, reporting the information on the difference may include reporting information on the difference based on reception of information configured to report the difference between the second measurement and the first measurement.

In an exemplary embodiment, the method may further include receiving information on resolution for reporting measurements related to the positioning.

In an exemplary embodiment, the information on the difference may be reported based on the resolution.

According to various embodiments of the present disclosure, an apparatus configured to operate in a wireless communication system may be provided.

In an exemplary embodiment, the apparatus may include: a memory; and one or more processors connected to the memory.

In an exemplary embodiment, the one or more processors may be configured to: receive a first DL RS and a second DL RS; obtain a first measurement related to positioning based on the first DL RS; report information on the first measurement; obtain a second measurement related to the positioning based on the second DL RS; and report information on a difference between the second measurement and the first measurement.

In an exemplary embodiment, the difference may be greater than or equal to 0.

In an exemplary embodiment, the apparatus may communicate with at least one of a mobile terminal, a network, or an autonomous driving vehicle other than a vehicle including the apparatus.

According to various embodiments of the present disclosure, a method performed by a network node in a wireless communication system may be provided.

In an exemplary embodiment, the method may include: transmitting a signal related to a first DL RS and a signal related to a second DL RS; receiving information on a first measurement related to positioning corresponding to the first DL RS; and receiving information on a difference between the first measurement and a second measurement related to the positioning corresponding to the second DL RS.

In an exemplary embodiment, the difference may be greater than or equal to 0.

According to various embodiments of the present disclosure, an apparatus configured to operate in a wireless communication system may be provided.

In an exemplary embodiment, the apparatus may include: a memory; and one or more processors connected to the memory.

In an exemplary embodiment, the one or more processors may be configured to: transmit a signal related to a first DL RS and a signal related to a second DL RS; receive information on a first measurement related to positioning corresponding to the first DL RS; and receive information on a difference between the first measurement and a second measurement related to the positioning corresponding to the second DL RS.

In an exemplary embodiment, the difference may be greater than or equal to 0.

According to various embodiments of the present disclosure, an apparatus configured to operate in a wireless communication system may be provided.

In an exemplary embodiment, the apparatus may include: one or more processors; and one or more memories configured to store one or more instructions that cause the one or more processors to perform a method.

In an exemplary embodiment, the method may include: receiving a first DL RS and a second DL RS; obtaining a first measurement related to positioning based on the first DL RS; reporting information on the first measurement; obtaining a second measurement related to the positioning based on the second DL RS; and reporting information on a difference between the second measurement and the first measurement.

In an exemplary embodiment, the difference may be greater than or equal to 0.

According to various embodiments of the present disclosure, a processor-readable medium configured to store one or more instructions that cause one or more processors to perform a method may be provided.

In an exemplary embodiment, the method may include: receiving a first DL RS and a second DL RS; obtaining a first measurement related to positioning based on the first DL RS; reporting information on the first measurement; obtaining a second measurement related to the positioning based on the second DL RS; and reporting information on a difference between the second measurement and the first measurement.

In an exemplary embodiment, the difference may be greater than or equal to 0.

Various embodiments as described above are only some of preferred embodiments of the various embodiments, and those skilled in the art may derive and understand many embodiments in which technical features of the various embodiments are reflected based on the following detailed description.

Advantageous Effects

According to various embodiments of the present disclosure, a method of transmitting and receiving a signal in a wireless communication system and apparatus for supporting the same may be provided.

For example, according to various embodiments of the present disclosure, a positioning method in a wireless communication system and apparatus for supporting the same may be provided.

For example, according to various embodiments of the present disclosure, a method of reporting a plurality of measurements based on a plurality of reference signals (RSs) in a wireless communication system and apparatus for supporting the same may be provided.

For example, according to various embodiments of the present disclosure, a method of reducing signaling overhead by reporting a different between a second measurement based on a second RS and a first measurement based on a first RS rather than the second measurement itself when the first measurement is reported and apparatus for supporting the same may be provided.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

DESCRIPTION OF DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

MODE FOR DISCLOSURE

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1.3GPP System 1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
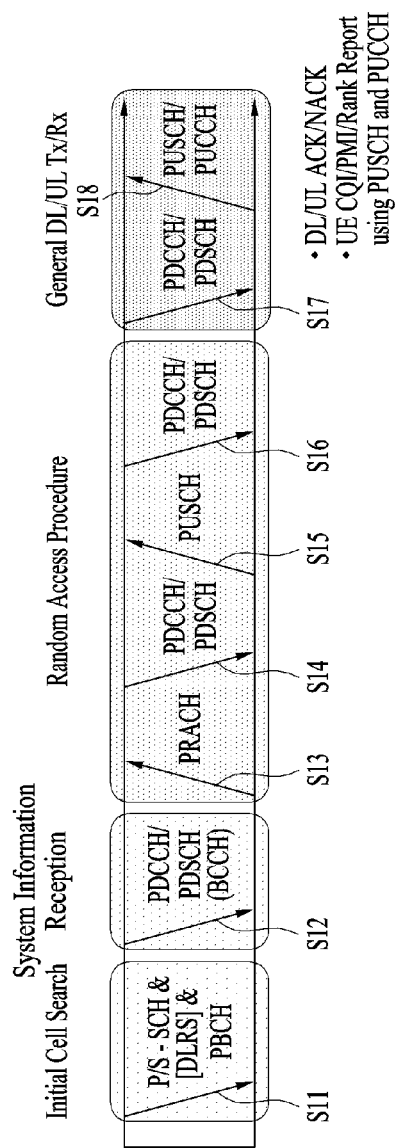
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

Thereafter, the UE may receive a physical broadcast channel (PBCH) signal from the BS to obtain information broadcast in the cell.

The UE may check a downlink channel state by receiving a downlink reference signal (DL RS) during the initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

When the random access procedure is performed in two steps, S13/S15 may be performed as one operation in which the UE performs transmission, and S14/S16 may be performed as one operation in which the BS performs transmission.

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
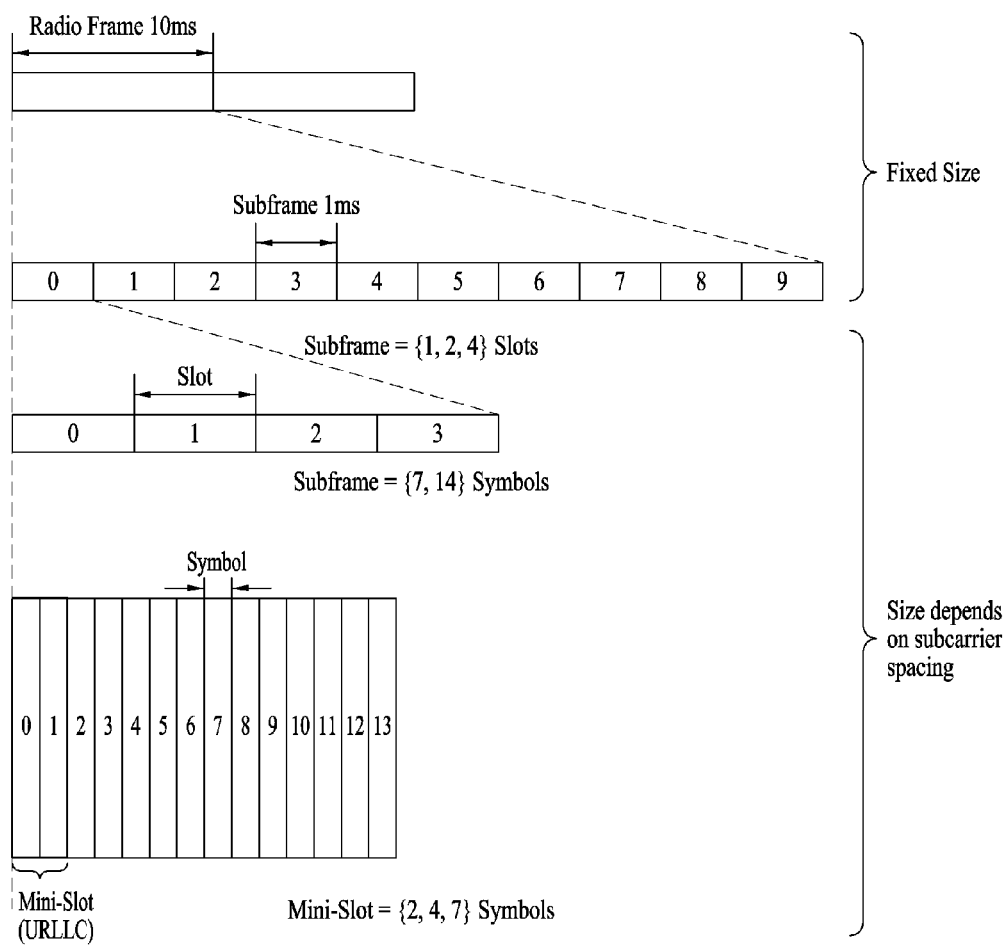
FIG. 2 is a diagram illustrating a resource grid in a new radio (NR) system to which various embodiments are applicable.

FIG. 2 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or $\mu$). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, $\mu$ and a CP are obtained from RRC parameters provided by the BS.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15 \text{ kHz})*2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=\Delta f_{max}*N_f/100)*T_c=1$ ms. There may exist one set of frames for UL and one set of frames for DL. For a numerology $\mu$, slots are numbered with $n^\mu_s \in \{0, \ldots, N^{slot,\mu}_{subframe}-1\}$ in an increasing order in a subframe, and with $n^\mu_{s,f} \in \{0, \ldots, N^{slot,\mu}_{frame}-1\}$ in an increasing order in a radio frame. One slot includes $N^\mu_{symb}$ consecutive OFDM symbols, and $N^\mu_{symb}$ depends on a CP. The start of a slot $n^\mu_s$ in a subframe is aligned in time with the start of an OFDM symbol $n^\mu_s*N^\mu_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with $\mu=2$ (i.e., an SCS of 60 kHz), in which referring to Table 3, one subframe may include four slots. One subframe={1, 2, 4} slots in FIG. 2, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Figure 3:
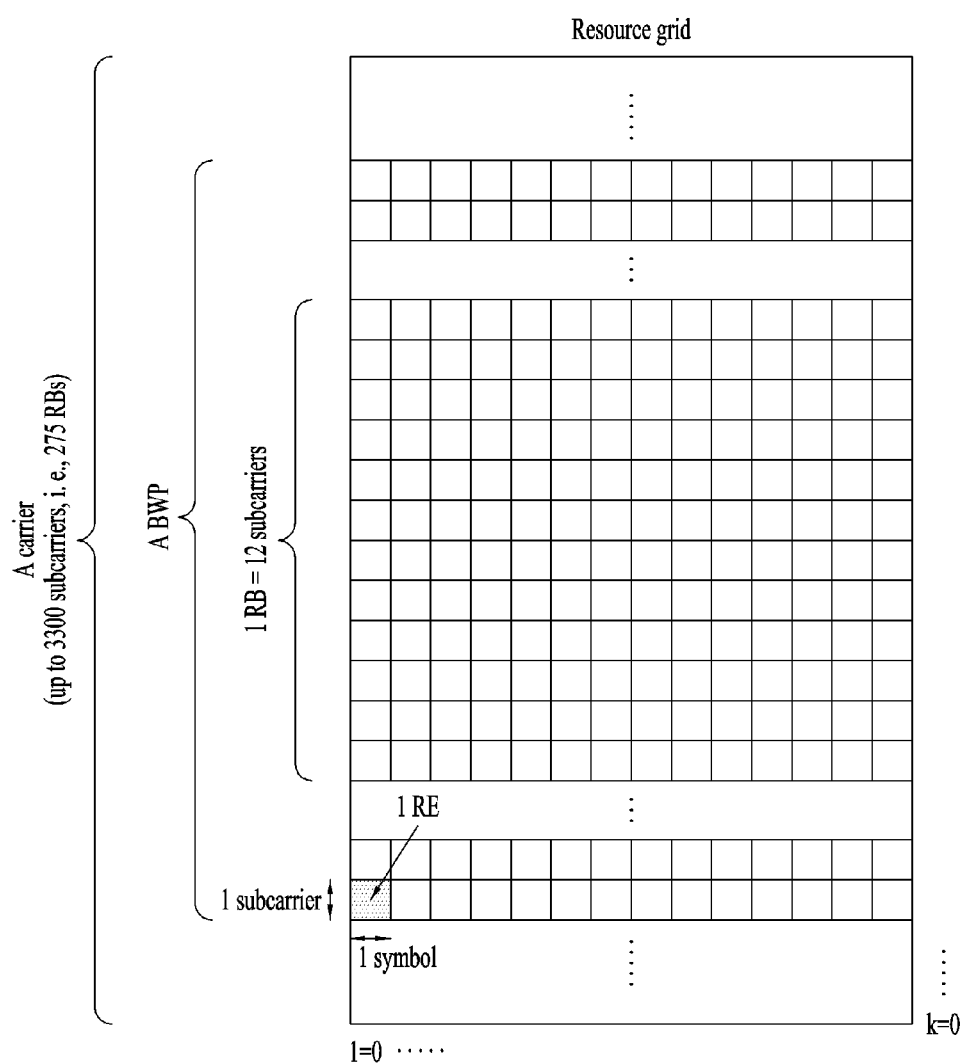
FIG. 3 is a diagram illustrating a slot structure in an NR system to which various embodiments of the present disclosure are applicable.

FIG. 3 is a diagram illustrating a slot structure in an NR system to which various embodiments of the present disclosure are applicable.

Referring FIG. 3, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
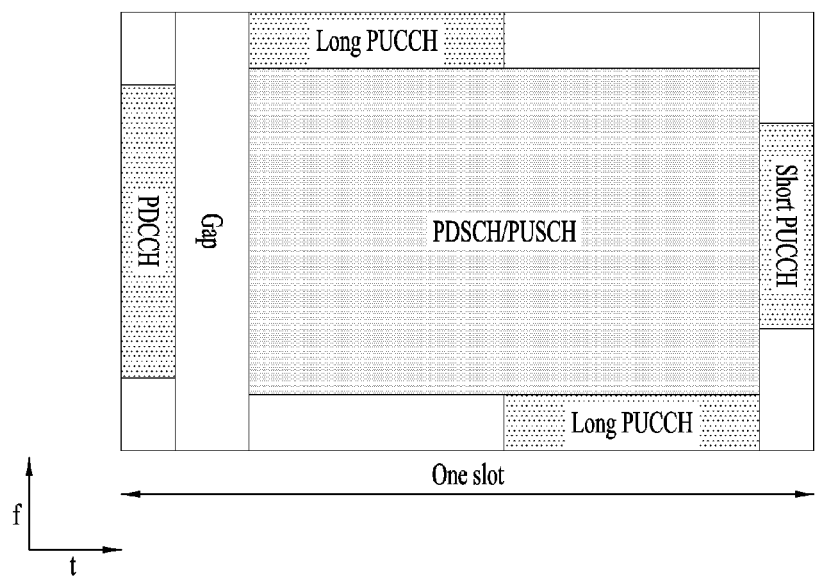
FIG. 4 is a diagram illustrating an example of mapping physical channels to a slot to which various embodiments of the present disclosure are applicable.

FIG. 4 is a diagram illustrating an example of mapping physical channels to a slot to which various embodiments of the present disclosure are applicable.

DL control channel(s), DL or UL data, and UL control channel(s) may all be included in one slot. For example, the first N symbols (hereinafter, referred to as a DL control region) of the slot may be used to transmit a DL control channel, and the last M symbols (hereinafter, referred to as a UL control region) of the slot may be used to transmit a UL control channel. N and M are each an integer greater than or equal to 0. A resource region (hereinafter, referred to as a data region) between the DL control region and the UL control region may be used for DL data transmission or UL data transmission. A time gap for DL-to-UL or UL-to-DL switching may exist between the control region and the data region. A PDCCH may be transmitted in the DL control region, and a PDSCH may be transmitted in the DL data region. Some symbols at the time of switching from DL to UL in the slot may be used as a time gap.

1.3. Channel Structures

1.3.1. DL Channel Structures

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

1.3.2. UL Channel Structures

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH. Table 7 lists exemplary PUCCH formats.

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.4. QCL (Quasi Co-Located or Quasi Co-Location)

An antenna port may be defined such that a channel that carries a symbol on the antenna port is inferred from a channel that carries another symbol on the same antenna port. When the properties of a channel carrying a symbol on an antenna port are inferred from a channel carrying a symbol on another antenna port, the two antenna ports may be said to be in the quasi co-located or quasi co-location (QC/QCL) relationship.

The channel properties may include at least one of the following factors: delay spread, Doppler spread, frequency/Doppler shift, average received power, and received timing/average delay, or spatial receive (RX) parameter. Here, the spatial Rx parameter refers to a spatial (RX) channel property parameter such as angle of arrival.

In order for the UE to decode a PDSCH based on a detected PDCCH with DCI intended for the corresponding UE and a given serving cell, a list of up to M TCI-state configurations may be configured by the higher layer parameter PDSCH-Config, where M depends on UE capability.

Each TCI-state includes parameters for establishing a QCL relationship between one or two DL RSs and DMRS ports of the PDSCH.

The QCL relationship is configured by the higher layer parameter qcl-Type1 for a first DL RS and the higher layer parameter qcl-Type2 for a second DL RS (if configured). For the two DL RSs, the QCL types may not be the same, regardless of whether the RSs are the same DL RS or different DL RSs.

The UE may receive a list of up to M TCI-state configurations to decode a PDSCH based on a detected PDCCH with DCI intended for the UE and a given cell. Here, M depends on UE capability.

Each TCI-state includes parameters for establishing a QCL relationship between one or two DL RSs and DMRS ports of the PDSCH. The QCL relationship is configured by the following RRC parameters: qcl-Type1 for the first DL RS and qcl-Type2 (if configured) for the second DL RS.

The QCL type of each DL RS is given by a parameter 'qcl-Type' in QCL-Info and have one of the following values:

- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

For example, if the target antenna port is a specific non-zero power (NZP) CSI-RS, corresponding NZP CSI-RS antenna ports may be indicated/configured to be QCL with a specific tracking reference signal (TRS) in terms of QCL-Type A and QCL with a specific SSB in terms of QCL-Type D. Upon receiving the above indication/configuration, the UE may receive the corresponding NZP CSI-RS based on Doppler and delay values measured on the QCL-TypeA TRS and apply a reception beam used to receive the QCL-TypeD SSB to the reception of the corresponding NZP CSI-RS.

The UE may receive an activation command used to map up to 8 TCI states to the code point of the DCI field 'Transmission Configuration Indication' through medium access control (MAC) control element (CE) signaling.

1.5. UL-DL Timing Relationship

Figure 5:
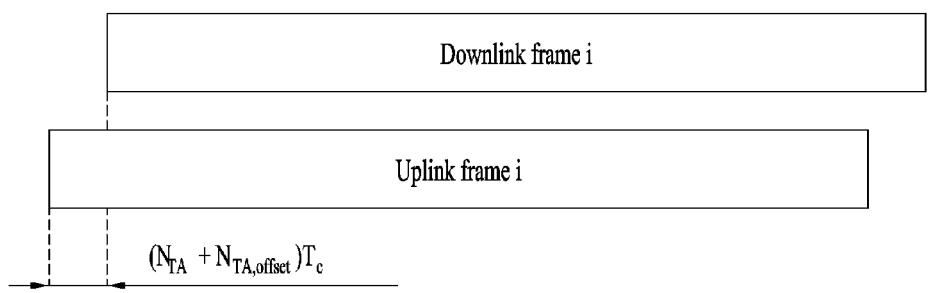
FIG. 5 is a diagram illustrating an exemplary UL-DL timing relationship, which is applicable to various embodiments of the present disclosure.

FIG. 5 is a diagram illustrating an exemplary UL-DL timing relationship applicable to various embodiments of the present disclosure.

Referring to FIG. 5, a UE starts to transmit UL frame i $T_{TA}(=(N_{TA}+N_{TA,offset})T_c)$ seconds before a DL radio frame corresponding to UL frame i. However, $T_{TA}=0$ exceptionally for a msgA transmission on a PUSCH. $T_c=0.509$ ns The UE may be provided with a value $N_{TA}$,offset of a timing advance (TA) offset for a serving cell by n-TimingAdvanceOffset for the serving cell. When the UE is not provided with n-TimingAdvanceOffset for the serving cell, the UE may determine a default value $N_{TA,offset}$ of the TA offset for the serving cell.

In the case of a random access response, a TA command, $T_A$ for a timing advance group (TAG) indicates $N_{TA}$ values by index values of $T_A=0, 1, 2, \ldots, 3846$, where an amount of the time alignment for a TAG with an SCS of $2^\mu*15$ kHz is $N_{TA}$ $(=T_A*16*64/2\mu)$. $N_{TA}$ is relative to the SCS of a first UL transmission from the UE after reception of a random access response.

In other cases, a TA command, TA for a TAG indicates adjustment of a current $N_{TA}$ value, $N_{TA\_old}$ to a new $N_{TA}$ value, $N_{TA\_new}$ by index values of $T_A$ $(=0, 1, 2, \ldots, 63)$, where for a SCS of $2^\mu*15$ kHz, $N_{TA\_new}=N_{TA\_old}+(T_A-31)*16*64/2^\mu$.

2. Positioning

Positioning may be a process of determining the geographical location and/or speed of a UE based on the measurement of a radio signal. A client (e.g., application) related to the UE may request location information, and the location information may be reported to the client. The location information may be included in a core network or requested by the client connected to the core network. The location information may be reported in a standard format such as cell-based or geographical coordinates. Herein, an estimation error of the location and speed of the UE and/or a positioning method used for the positioning may also be reported.

2.1. Positioning Protocol Configuration

Figure 6:
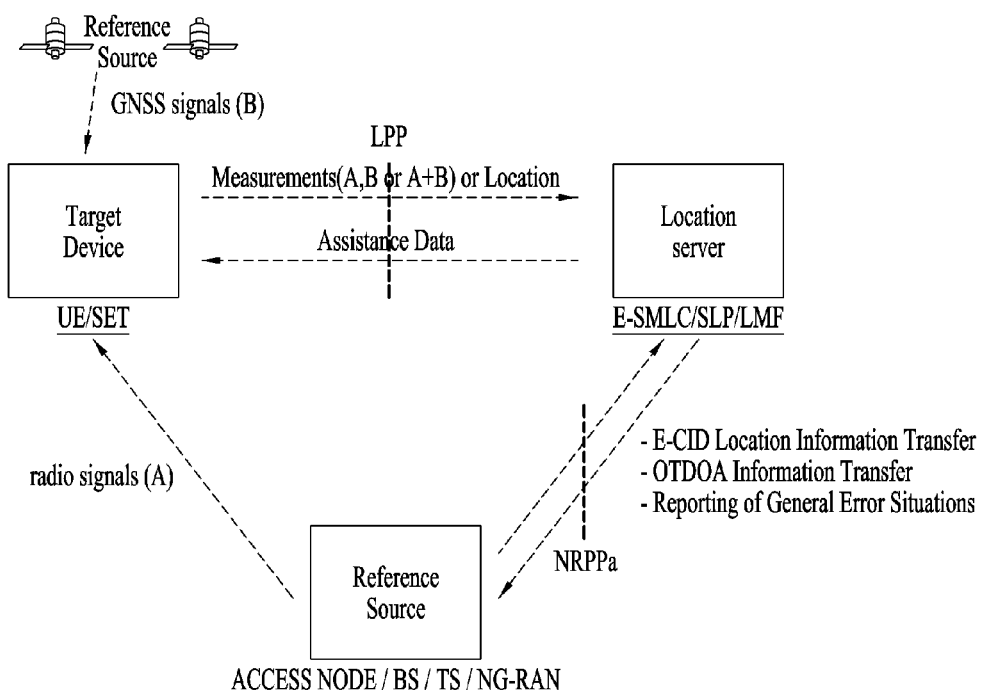
FIG. 6 is a diagram illustrating an exemplary positioning protocol configuration for user equipment (UE) positioning, which is applicable to various embodiments of the present disclosure.
Figure 7:
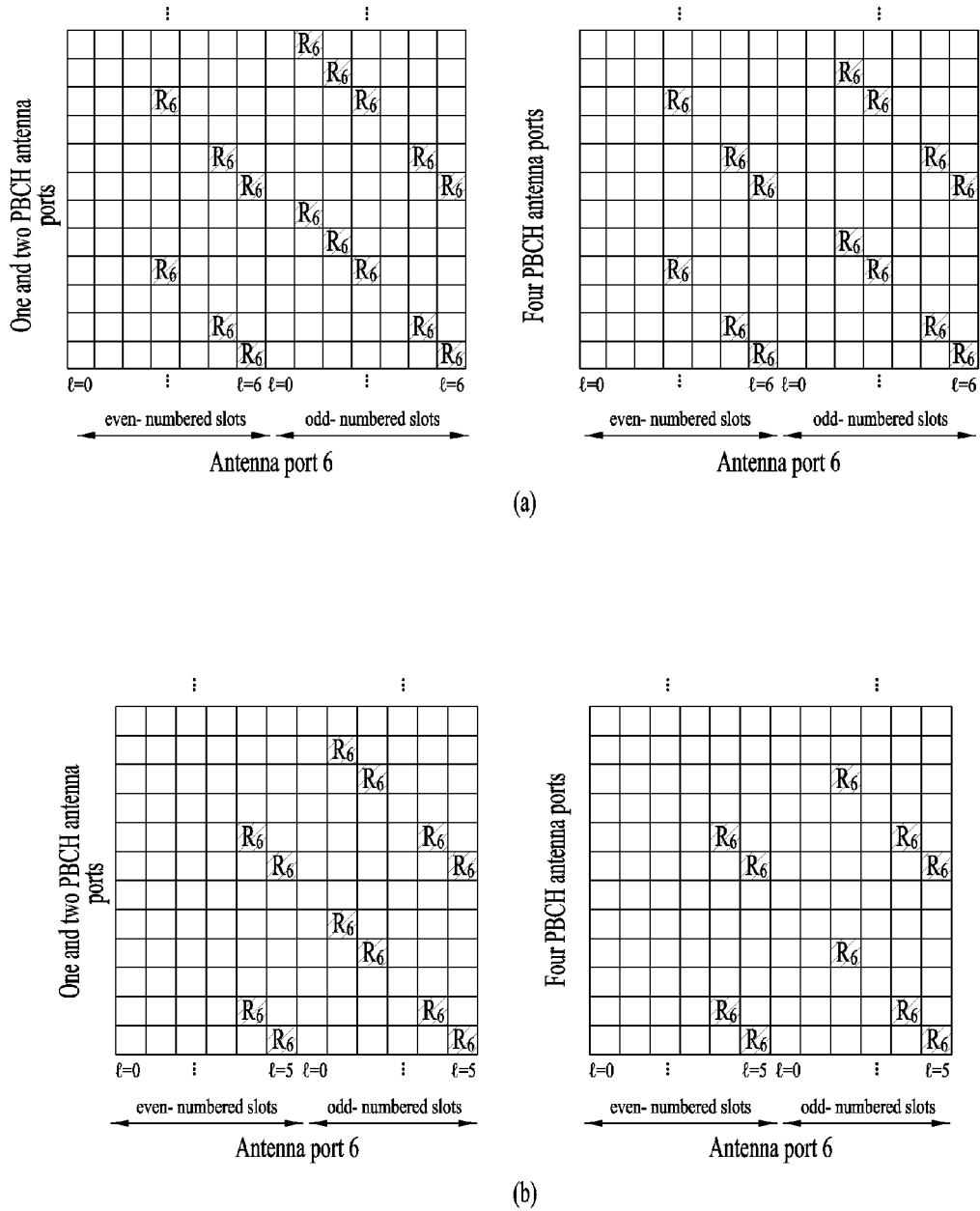
FIG. 7 illustrates exemplary mapping of a positioning reference signal (PRS) in a long term evolution (LTE) system to which various embodiments of the present disclosure are applicable.

FIG. 6 is a diagram illustrating an exemplary positioning protocol configuration for UE positioning, to which various embodiments of the present disclosure are applicable.

Referring to FIG. 6, an LTE positioning protocol (LPP) may be used as a point-to-point protocol between a location server (E-SMLC and/or SLP and/or LMF) and a target device (UE and/or SET) in order to position a target device based on positioning-related measurements obtained from one or more reference sources. The target device and the location server may exchange measurements and/or location information based on signal A and/or signal B through the LPP.

NR positioning protocol A (NRPPa) may be used for exchanging information between a reference source (access node and/or BS and/or TP and/or NG-RAN node) and a location server.

NRPPa may provide the following functions:
E-CID Location Information Transfer. This function allows exchange of location information between a reference source and an LMF, for the purpose of E-CID positioning.
OTDOA Information Transfer. This function allows exchange of information between the reference source and the LMF for the purpose of OTDOA positioning.
Reporting of General Error Situations. This function allows reporting of general error situations, for which function specific error messages have not been defined.

2.2. PRS in LTE System

For such positioning, a positioning reference signal (PRS) may be used. The PRS is a reference signal used to estimate the position of the UE.

For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as subframe #0. If only MBSFN subframes are configured as the positioning subframes within a cell, OFDM symbols configured for the PRS in the MBSFN subframes may have an extended CP.

The sequence of the PRS may be defined by Equation 1 below.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 1]

$$m = 0, 1, \ldots, 2N_{RB}^{max,DL} - 1$$

In Equation 1, ll, denotes a slot number in a radio frame and l denotes an OFDM symbol number in a slot. $N_{RB}^{max,DL}$ the largest of DL bandwidth configurations, expressed as $N_{SC}^{RB}$. $N_{SC}^{RB}$ denotes the size of an RB in the frequency domain, for example, 12 subcarriers.

c(i) denotes a pseudo-random sequence and may be initialized by Equation 2 below.

$$c_{init} = 2^{28} \cdot \lfloor N_{ID}^{PRS}/512 \rfloor + 2^{10} \cdot (7 \cdot (n_s+1)+l+1) \cdot (2 \cdot (N_{ID}^{PRS} \bmod 512)+1) + 2 \cdot (N_{ID}^{PRS} \bmod 512) + N_{CP}$$ [Equation 2]

Unless additionally configured by higher layers, $N_{ID}^{PRS}$ is equal to $N_{ID}^{cell}$, and $N_{CP}$ is 1 for a normal CP and 0 for an extended CP.

Figure 11:
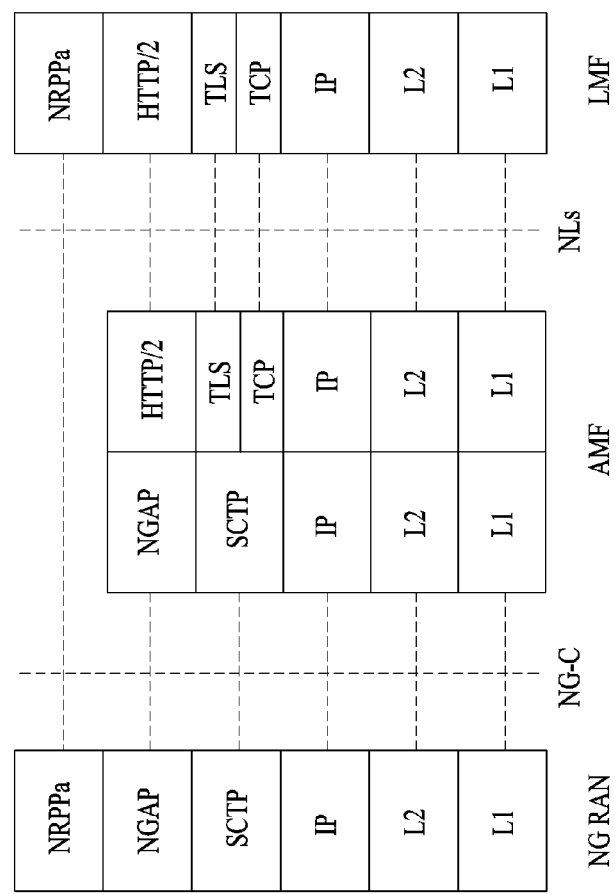
FIG. 11 is a diagram illustrating protocol layers for supporting NR positioning protocol A (NRPPa) protocol data unit (PDU) transmission, to which various embodiments are applicable.

FIG. 11 illustrates an exemplary pattern to which a PRS is mapped in a subframe.

As illustrated in FIG. 11, the PRS may be transmitted through an antenna port 6. FIG. 11(*a*) illustrates mapping of the PRS in the normal CP and FIG. 11(*b*) illustrates mapping of the PRS in the extended CP.

The PRS may be transmitted in consecutive subframes grouped for position estimation. The subframes grouped for position estimation are referred to as a positioning occasion. The positioning occasion may consist of 1, 2, 4 or 6 subframe. The positioning occasion may occur periodically with a periodicity of 160, 320, 640 or 1280 subframes. A cell-specific subframe offset value may be defined to indicate the starting subframe of PRS transmission. The offset value and the periodicity of the positioning occasion for PRS transmission may be derived from a PRS configuration index as listed in Table 11 below.

TABLE 5

| PRS configuration Index ($I_{PRS}$) | PRS periodicity (subframes) | PRS subframe offset (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | | Reserved |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed as a low-interference subframe so that no data is transmitted in the positioning subframe. Therefore, the PRS is not subjected to interference due to data transmission although the PRS may interfere with PRSs of other cells.

2.3. UE Positioning Architecture in NR System

Figure 8:
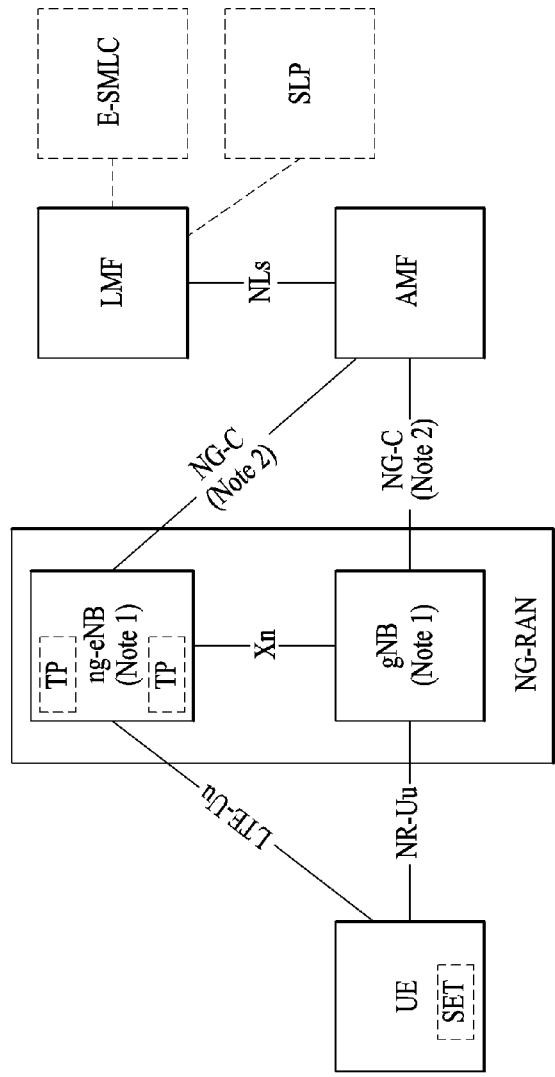
FIG. 8 is a diagram illustrating an example of an architecture of a system for positioning a UE, to which various embodiments of the present disclosure are applicable.

FIG. 8 illustrates architecture of a 5G system applicable to positioning of a UE connected to an NG-RAN or an E-UTRAN.

Referring to FIG. 8, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 9:
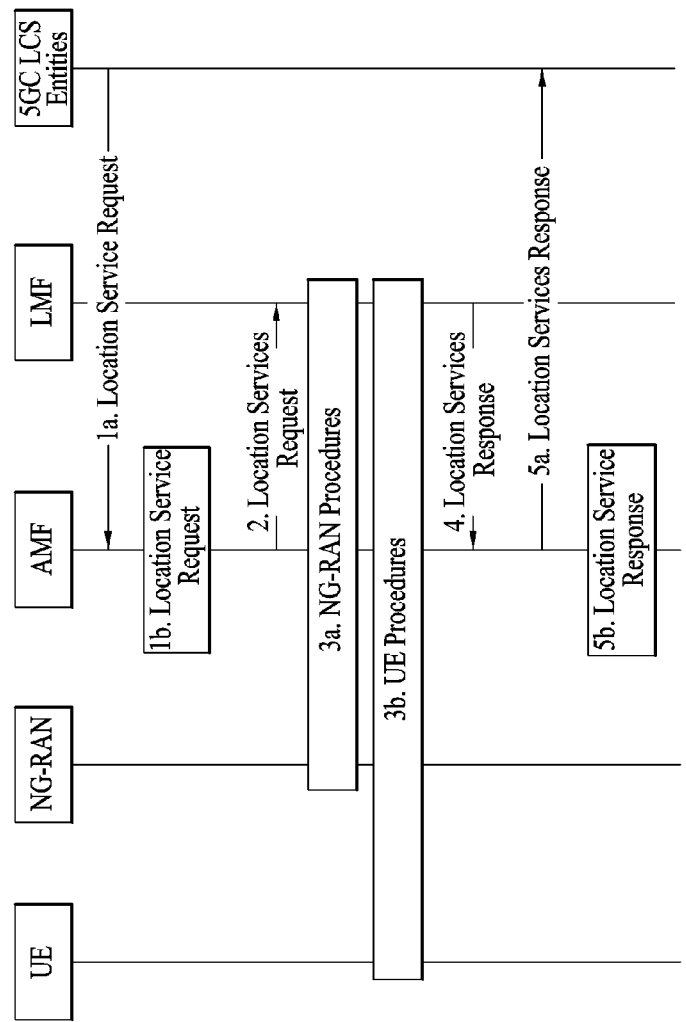
FIG. 9 is a diagram illustrating an example of a procedure of positioning a UE, to which various embodiments of the present disclosure are applicable.

FIG. 9 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 9. In other words, in FIG. 9 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 9. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 9 has been initiated by step 1a, the AMF may transfer the location service response to a 5GC entity such as a GMLC. If the procedure of FIG. 9 has been initiated by step 1b, the AMF may use the location service response in order to provide a location service related to an emergency call.

2.5. Positioning Protocol

2.5.1. LTE Positioning Protocol (LPP)

Figure 10:
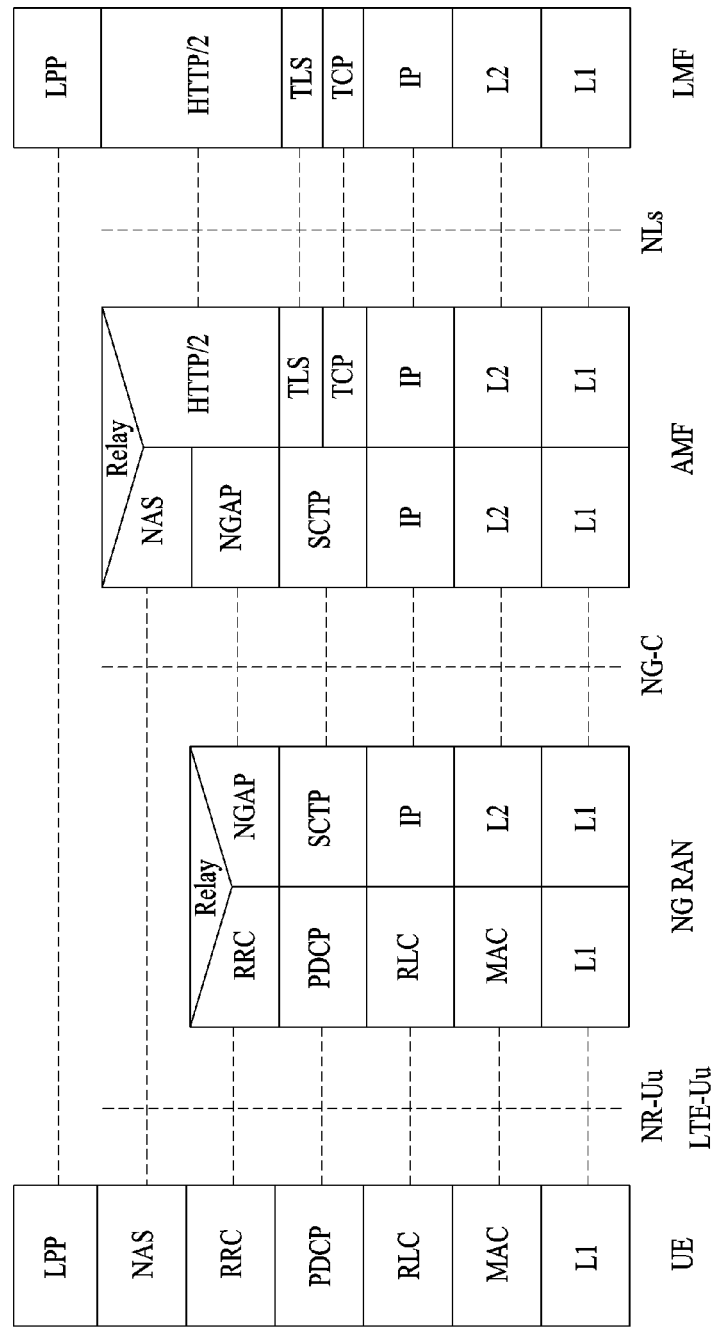
FIG. 10 is a diagram illustrating protocol layers for supporting LTE positioning protocol (LPP) message transmission, to which various embodiments are applicable.

FIG. 10 illustrates an exemplary protocol layer used to support LPP message transfer between an LMF and a UE. An LPP protocol data unit (PDU) may be carried in a NAS PDU between an AMF and the UE.

Referring to FIG. 10, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

2.5.2. NR Positioning Protocol A (NRPPa)

FIG. 11 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is anon-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

2.6.1. OTDOA (Observed Time Difference of Arrival)

Figure 12:
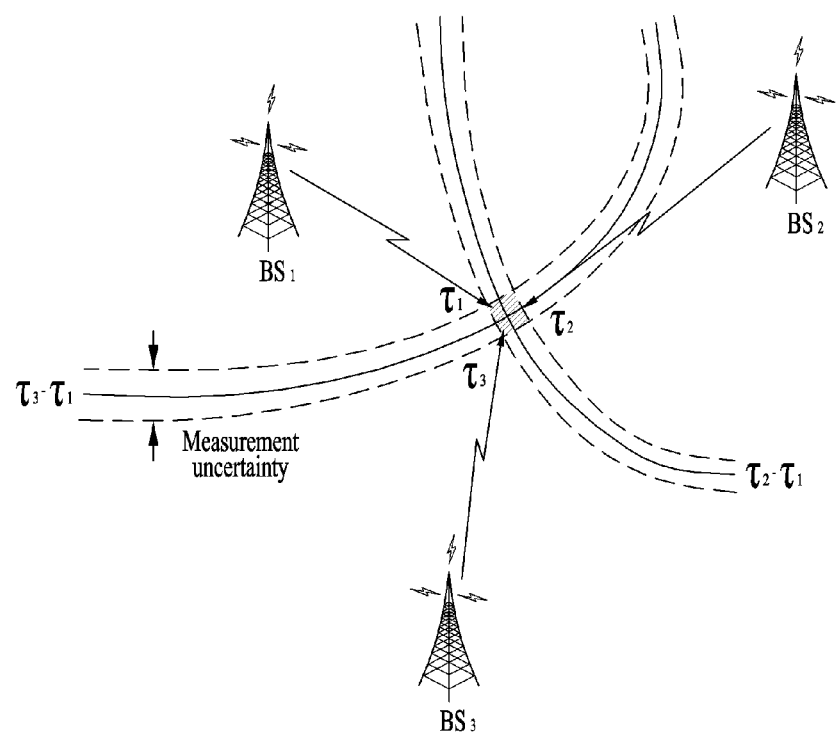
FIG. 12 is a diagram illustrating an observed time difference of arrival (OTDOA) positioning method, to which various embodiments are applicable.

FIG. 12 is a diagram illustrating an observed time difference of arrival (OTDOA) positioning method, to which various embodiments are applicable;

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 3 below.

$$RSTDi_{,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 3]

In Equation 3, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i-T_1)$ is a transmission time offset between two TPs, referred to as "real time differences" (RTDs), and $n_i$ and $n_1$ are UE ToA measurement error values.

2.6.2. E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RS SI), UTRAN common pilot channel (CPICH) received signal code power (RSCP), and/or UTRAN CPICH Ec/Io E-UTRAN measurement: ng-eNB Rx-Tx time difference, timing advance ($T_{ADV}$), and/or AoA Here, $T_{ADV}$ may be divided into Type 1 and Type 2 as follows.

$T_{ADV}$ Type 1=(ng-eNB Rx-Tx time difference)+(UE E-UTRA Rx-Tx time difference)

$T_{ADV}$ Type 2=ng-eNB Rx-Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

2.6.3. UTDOA (Uplink Time Difference of Arrival)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

2.6.4. Multi RTT (Multi-Cell RTT)

Compared to OTDOA positioning requiring fine synchronization (e.g., at the nano-second level) between TPs in the network, RTT positioning requires only coarse timing TRP (e.g., BS) synchronization although it is based on TOA measurements like OTDOA positioning.

Figure 13:
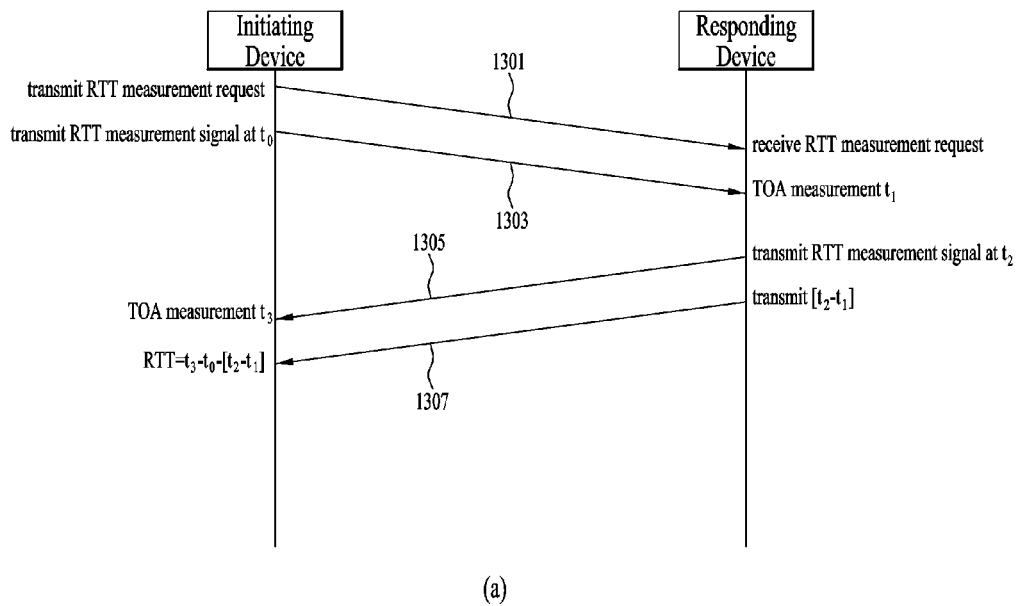
FIG. 13 is a diagram illustrating a multi-round trip time (multi-RTT) positioning method to which various embodiments are applicable.
Figure 13:
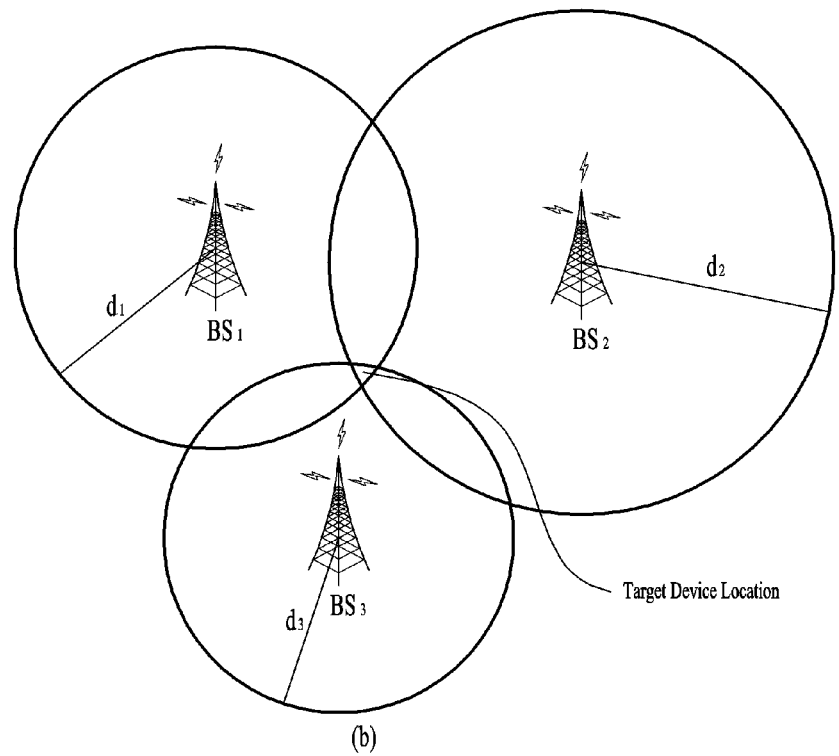

FIG. 13 is a diagram illustrating an exemplary multi-RTT positioning method to which various embodiments of the present disclosure are applicable.

Referring to FIG. 13(a), an RTT process is illustrated, in which an initiating device and a responding device perform TOA measurement, and the responding device provides a TOA measurement to the initiating device, for RTT measurement (calculation). For example, the initiating device may be a TRP and/or a UE, and the responding device may be a UE and/or a TRP.

In operation 1701 according to an exemplary embodiment, the initiating device may transmit an RTT measurement request, and the responding device may receive the RTT measurement request.

In operation 1703 according to an exemplary embodiment, the initiating device may transmit an RTT measurement signal at time $t_0$, and the responding device may obtain TOA measurement $t_1$.

In operation 1705 according to an exemplary embodiment, the responding device may transmit an RTT measurement signal at time $t_2$, and the initiating device may obtain TOA measurement $t_3$.

In operation 1707 according to an exemplary embodiment, the responding device may transmit information about $[t_2-t_1]$, and the initiating device may receive the corresponding information and calculate an RTT based on Equation 4 below. The corresponding information may be transmitted and received by a separate signal or in the RTT measurement signal of operation 1705.

$$RTT = t_3 - t_0 - [t_2 - t_1] \quad \text{[Equation 4]}$$

Referring to FIG. 13(*b*), an RTT may correspond to a double-range measurement between two devices. Positioning estimation may be performed from the corresponding information, and multilateration may be used for the positioning estimation. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered, respectively.

3. Various Embodiments of the Present Disclosure

Various embodiments of the present disclosure will be described below in detail based on the above-described technical idea. Clause 1 and clause 2 may be applied to the various embodiments of the present disclosure. For example, operations, functions, and terms which are not defined in the various embodiments of the present disclosure may be performed and described based on clause 1 and clause 2.

Symbol/abbreviations/terms used in the following description of various embodiments of the present disclosure are described below.

A/B/C: A and/or B and/or C
AOA (AoA): angle of arrival
AOD (AoD): angle of departure
CSI-RS: channel state information reference signal
DL: downlink
LMF: location management function
LPP: LTE positioning protocol
NRPPa: NR positioning protocol a
OTDOA (OTDoA): observed time difference of arrival
PRS: positioning reference signal
RS: reference signal
RTT: round trip time
RSRP: reference signal reception power
RSTD: reference signal time difference/relative signal time difference
SS: synchronization signal
SSB: synchronization signal block
SS/PBCH: synchronization signal/physical broadcast channel
TDOA (TDoA): timing difference of arrival
TOA (ToA): time of arrival
TRP: transmission reception point (TP: transmission point)
UL: uplink In the description of various embodiments of the present disclosure, the term BS may be understood as an umbrella term including a remote radio head (RRH), eNB, gNB, TP, reception point (RP), relay, etc.

In the description of various embodiments of the present disclosure, the term LMF may be understood as an umbrella term including location servers of LTE and/or NR.

In the description of various embodiments of the present disclosure, the SSB and/or SS/PBCH block may refer to a signal occupying 20 resource blocks (RBs) in the frequency domain and transmitted at a predetermined period. For example, the SSB may be a signal configured for Layer 1 RSRP (L1 RSRP) measurement and/or Layer 3 RSRP (L3-RSRP) measurement, and the UE may receive the SSB from a serving cell/BS/TRP and/or an adjacent (neighboring) cell/BS/TRP.

In the description of various embodiments of the present disclosure, a measurement may mean a measurement to be used for UE positioning. For example, a measurement may mean any one of the following values: TOA/TOF/reception-transmission time difference (RX-TX time difference)/RSTD/RSRP/AOA/AOD, etc. Although various embodiments of the present disclosure are mainly described based on the RSTD, but the RSTD may be replaced with any one of the following values: TOA/TOF/RX-TX time difference/RSRP/AOA/AOD, etc.

In the description of various embodiments of the present disclosure, a (DL) RSTD may be a (DL) relative timing difference between positioning node j and reference positioning node i, which may be defined by $T_{SubframeRxj} - T_{SubframeRxi}$.

$T_{SubframeRxj}$ may be the time at which the UE receives the start of one subframe from positioning node j ($T_{SubframeRxj}$ is the time when the UE receives the start of one subframe from positioning node j).

$T_{SubframeRxi}$ may be the time at which the UE receives the corresponding start of one subframe from positioning node i that is the closest in time to a subframe received from the positioning node j ($T_{SubframeRxj}$ is the time when the UE receives the corresponding start of one subframe from positioning node i that is closest in time to the subframe received from positioning node j).

In the description of various embodiments of the present disclosure, a (UE) RX-TX time difference may be defined by $T_{UE-RX} - T_{UE-TX}$.

$T_{UE-RX}$ may mean the timing at which the UE receives (DL) subframe #i from a positioning node, which is defined by the first detected path in time ($T_{UE-RX}$ is the UE received timing of downlink subframe #i from a positioning node, defined by the first detected path in time).

$T_{UE-TX}$ is the timing at which the UE transmits (UL) subframe #j that is closest in time to subframe #i received from a positioning node ($T_{UE-TX}$ is the time when the UE receives the corresponding start of one subframe from positioning node i that is closest in time to the subframe received from positioning node j).

In the description of various embodiments of the present disclosure, an RS (e.g., PRS) resource set may include one or more RS resources. The identity of the RS resource set may be defined by the ID (identifier)/index assigned to the RS resource set. A specific RS resource set may be configured in association with a specific cell/TP/BS.

For example, assuming that RS resource set 1={0, 1, 2, 3} and RS resource set 2={0, 1, 2, 3} (in this example, the elements of each set are RS resources (IDs)), each set has the same RS resources (IDs). Thus, RS resources may not be identified only by information on the RS resources (IDs), so that information on RS resource sets (IDs) may need to be provided together. As another example, if RS resources are capable of being identified by one of the RS resource sets (IDs) or the RS resources (IDs), either information on the corresponding RS resource sets (IDs) or information on the RS resources (IDs) may be provided.

In the description of various embodiments of the present disclosure, when the RS is a PRS, the PRS may be transmitted/received based on one or more PRS resources and/or one or more PRS resource sets. For example, a DL PRS resource set may be defined as a set of DL PRS resources. For example, each DL PRS resource may have a DL PRS resource ID (identifier).

For example, DL PRS resources included in a DL PRS resource set may be associated with the same TRP.

For example, a TRP may transmit one or more beams. For example, the ID of a DL PRS resource included in a DL PRS resource set may be associated with one beam transmitted from a single TRP.

For example, the examples described above may be independent of whether a TRP and beam over which a signal is transmitted is known to the UE.

In the description of various embodiments of the present disclosure, when it is said that something is more than/more than or equal to A, it may be interpreted to mean that A is more than or equal to/more than A.

In the description of various embodiments of the present disclosure, when it is said that something is less than/less than or equal to B, it may be interpreted to mean that the thing is less than or equal to/less than B.

Various embodiments of the present disclosure may relate to methods of effectively using a PRS and/or other DL RSs for effective UE positioning. For example, various embodiments of the present disclosure may relate to methods of joint use of a PRS and other DL RSs.

Figure 14:
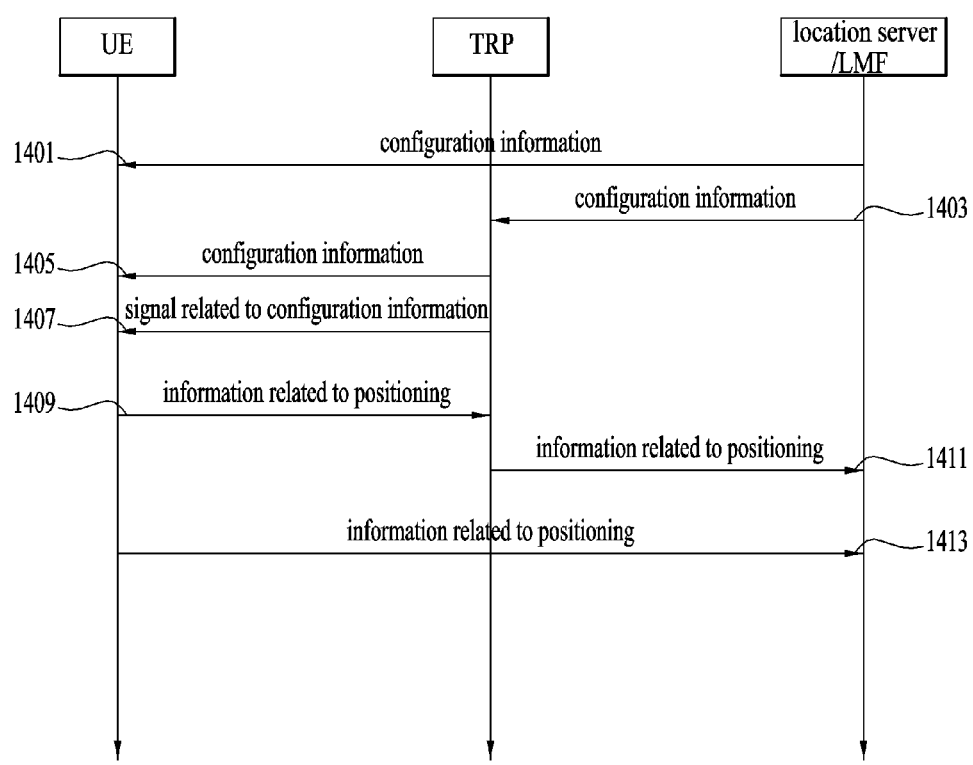
FIG. 14 is a simplified diagram illustrating a method of operating a UE, a transmission and reception point (TRP), a location server, and/or a location management function (LMF) according to various embodiments.

FIG. 14 is a diagram schematically illustrating an operation method for a UE, a TRP, a location server, and/or an LMF according to various embodiments of the present disclosure.

Referring to FIG. 14, in operation 1401 according to an exemplary embodiment, the location server and/or LMF may transmit configuration information to the UE, and the UE may receive the configuration information.

In operation 1403 according to an exemplary embodiment, the location server and/or LMF may transmit reference configuration information to the TRP, and the TRP may receive the reference configuration information. In operation 1405 according to an exemplary embodiment, the TRP may forward the reference configuration information to the UE, and the UE may receive the reference configuration information. In this case, operation 1401 according to the exemplary embodiment may be omitted.

On the contrary, operations 1403 and 1405 according to the exemplary embodiments may be omitted. In this case, operation 1401 according to the exemplary embodiment may be performed.

In other words, operations 1401 according to the exemplary embodiment and operations 1403 and 1405 according to the exemplary embodiments may be exclusive.

In operation 1407 according to an exemplary embodiment, the TRP may transmit a signal related to configuration information to the UE, and the UE may receive the signal related to configuration information. For example, the signal related to configuration information may be a signal for UE positioning.

In operation 1409 according to an exemplary embodiment, the UE may transmit a signal related to positioning to the TRP, and the TRP may receive the signal related to positioning. In operation 1411 according to an exemplary embodiment, the TRP may forward the signal related to positioning to the location server and/or LMF, and the location server and/or LMF may receive the signal related to positioning.

In operation 1413 according to an exemplary embodiment, the UE may transmit the signal related to positioning to the location server and/or LMF, and the location server and/or LMF may receive the signal related to positioning. In this case, operations 1409 and 1411 according to the exemplary embodiments may be omitted.

On the contrary, operation 1413 according to the exemplary embodiment may be omitted. In this case, operations 1411 and 1413 according to the exemplary embodiments may be performed.

In other words, operations 1409 and 1411 according to the exemplary embodiments and operations 1413 according to the exemplary embodiment may be exclusive.

In an exemplary embodiment, the signal related to positioning may be obtained based on the configuration information and/or the signal related to configuration information.

Figure 15:
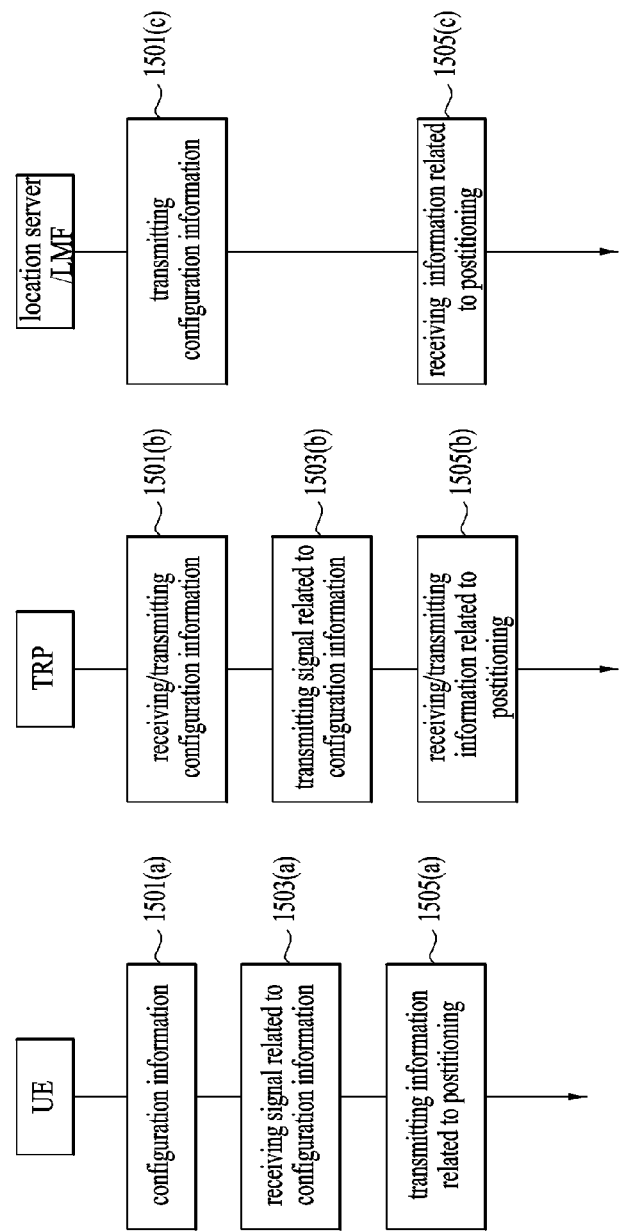
FIG. 15 is a simplified diagram illustrating a method of operating a UE, a TRP, a location server, and/or an LMF according to various embodiments.

FIG. 15 is a diagram schematically illustrating an operation method for a UE, a TRP, a location server, and/or an LMF according to various embodiments of the present disclosure.

Referring to FIG. 15(a), in operation 1501(a) according to an exemplary embodiment, the UE may receive configuration information.

In operation 1503(a) according to an exemplary embodiment, the UE may receive a signal related to configuration information.

In operation 1505(a) according to an exemplary embodiment, the UE may transmit information related to positioning.

Referring to FIG. 15(b), in operation 1501(b) according to an exemplary embodiment, the TRP may receive configuration information from the location server and/or LMF and forward the configuration information to the UE.

In operation 1503(b) according to an exemplary embodiment, the TRP may transmit a signal related to configuration information.

In operation 1505(b) according to an exemplary embodiment, the TRP may receive information related to positioning and forward the information related to positioning to the location server and/or LMF.

Referring to FIG. 15(c), in operation 1501(c) according to an exemplary embodiment, the location server and/or LMF may transmit configuration information.

In operation 1505(c) according to an exemplary embodiment, the location server and/or LMF may receive information related to positioning.

For example, in the following description of various embodiments of the present disclosure, the above-described configuration information may be understood to be related to a reference configuration (information), a standard configuration (information), a consultation configuration (information), and/or one or more pieces of information transmitted/configured by the location server, LMF, and/or TRP to the UE. Additionally/alternatively, the configuration information may be interpreted to mean the corresponding reference configuration (information), standard configuration (information), consultation configuration (information), and/or one or more pieces of information transmitted/configured by the location server, LMF, and/or TRP to the UE.

For example, in the following description of various embodiments of the present disclosure, the above-described signal related to positioning may be understood as a signal related to one or more pieces of information reported by the UE. Additionally/alternatively, the signal related to positioning may be understood as a signal including one or more pieces of information reported by the UE.

For example, in the following description of various embodiments of the present disclosure, a BS, a gNB, a cell, etc. may be replaced with a TRP, a TP, or any device that plays the same role.

For example, in the following description of various embodiments of the present disclosure, a location server may be replaced with an LMF or any device that plays the same role.

Particular operations, functions, terms, etc. in the operations according to each exemplary embodiment may be performed and explained based on various embodiments of the present disclosure to be described later. On the other hand, the operations according to each exemplary embodiment are merely exemplary, and one or more of the above-described operations may be omitted depending on the details of each embodiment.

Hereinafter, various embodiments of the present disclosure will be described in detail. It may be understood by those of ordinary skill in the art that the various embodiments of the present disclosure described below may be combined in whole or in part to implement other embodiments of the present disclosure unless mutually exclusive.

3.1. Proposal #1

Figure 16:
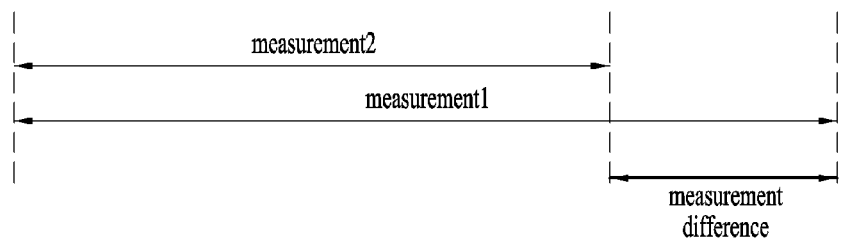
FIG. 16 is a diagram illustrating reporting of timing measurements according to various embodiments of the present disclosure.

FIG. 16 is a diagram illustrating reporting of timing measurements according to various embodiments of the present disclosure.

Referring to FIG. 16, the UE may report to the LMF/location server/BS measurement 1 obtained based on a first DL RS resource and/or resource set. When the UE is configured to report (as an additional measurement) measurement 2 obtained based on a second DL RS resource and/or resource set, the UE may report a difference between measurement 1 and measurement 2, instead of reporting measurement 2.

For example, the first DL RS resource and/or resource set and the second DL RS resource and/or resource set may be transmitted/received on transmission/reception beams with the same direction among a plurality of transmission/reception beams with different directions.

For example, the first DL RS and the second DL RS may be the same type of signal and/or different types of signals.

The UE may be configured to use different types of DL RSs (or the same type of multiple DL RSs) in order to obtain and/or report measurement(s) to be used for UE positioning. That is, the UE may be configured to use different DL RSs to obtain and/or report measurements The UE may be instructed/configured by the LMF/location server/BS to report to the LMF/location server/BS a timing related measurement (e.g., TOA, RSTD, RX-TX time difference measurement, and/or angle related measurement (e.g., AOD, AOD, etc.)), which is obtained based on the first DL RS resource and/or resource set.

In addition, the UE may be instructed/configured (by the LMF/location server/BS) to report to the LMF/location server/BS only a difference between the timing related measurement obtained based on the first DL RS resource and/or resource set and a timing related measurement (e.g., TOA, RSTD, RX-TX time difference measurement, and/or angle related measurement (e.g., AOD, AOD, etc.)), which is obtained based on the second DL RS resource and/or resource set. The timing related measurement obtained based on the second DL RS resource and/or resource set may be an additional measurement to be reported after reporting the timing measurement obtained based on the first DL RS resource and/or resource set. The measurement based on the first DL RS may be the smallest value among measurements. The measurement obtained based on the second DL RS may be greater than or equal to the corresponding minimum value, so that the measurement may be a positive value and/or a value greater than or equal to 0.

For example, the UE may be configured/instructed to obtain and/or report RSTD measurements based on an SS/PBCH block and a PRS. In this case, the UE may be instructed/configured by the LMF/location server/BS to report an RSTD measurement ($RSTD_{SSB}$) obtained based on the SS/PBCH block to the LMF/location server/BS. In addition, the UE may be configured to report an RSTD measurement ($RSTD_{PRS}$) obtained based on the configured PRS. More particularly, the UE may be configured/instructed to report to the LMF/location server/BS±$RSTD_A$, which is a difference between $RSTD_{SSB}$ and $RSTD_{PRS}$. In this example, the SS/PBCH block and/or PRS is merely exemplary, that is, the SS/PBCH block and/or PRS may be replaced with any DL RS. For example, each DL RS may be the same or different types of DL RSs.

Here, $RSTD_A$ may be defined by $|RSTD_{PRS}-RSTD_{SSB}|=RSTD_A$. That is, $RSTD_A$ denotes the absolute value of the difference between the RSTD value obtained based on the SSB and the RSTD value obtained based on the PRS. The absolute value of the difference may be a real number/integer greater than or equal to 0.

When the UE reports $RSTD_{SSB}$ and $RSTD_A$ (and/or even when the UE reports the RSTD measurement obtained based on the PRS), the sign of the RSTD value may be reported by allocating one bit for indicating the positive or negative sign, and/or the absolute value of the RSTD value excluding the sign may be reported separately, unlike RSTD reporting methods through LTE positioning protocol (LPP). The sign (i.e., positive (+) or negative (−)) of $RSTD_{PRS}-RSTD_{SSB}$ (and/or $RSTD_{SSB}-RSTD_{PRS}$) may be indicated by one bit. For example, '0' (or '1') may correspond to the positive (+) sign, and '1' (or '0') may correspond to the negative (−) sign. Additionally/alternatively, the absolute value of $RSTD_{PRS}-RSTD_{SSB}$ (and/or $RSTD_{SSB}-RSTD_{PRS}$) may be signaled by bit(s) other than the sign bit. According to various embodiments of the present disclosure, reporting signaling overhead may be reduced.

Specifically, to report accurate UE measurements, two tables with different reporting resolution may be considered, where reporting values to be used when reporting measurements measured based on the first DL RS and the second DL RS are divided into groups. Considering RSTD values as an example, Table 9.1.10.3-1 of TS 36.133: RSTD report mapping may be considered as a first table, and Table 9.1.10.4-1 of TS 36.133: Relative quantity mapping for higher-resolution RSTD measurement reporting may be considered as a second table for high resolution. In this case, an RSTD index corresponding to a RSTD value to which the measurement obtained based on the first DL RS (e.g., SS/PBCH) belongs is reported in the first table. In addition, a more accurate RSTD measurement may be obtained based on the second DL RS (e.g., PRS), and a value (RSTD delta) corresponding to a difference from the value reported in the first table may be reported. In other words, a value (reported value) for reporting the RSTD obtained based on the first DL RS may be obtained from the first table. To report the RSTD obtained based on the second DL RS, a value (reported relative quantity value) corresponding to the difference between the reported value obtained from the first table (or the RSTD obtained based on the first DL RS) and the RSTD obtained based on the second DL RS may be obtained from the second table. In this example, the delta value is always positive (+), but the sign may be considered and reported. For example, one bit for indicating the sign may be allocated, and the remaining bits may indicate the absolute value as described above.

Table 6 below may be considered as an example of the first table (Table 9.1.10.3-1 of TS 36.133: RSTD report mapping).

TABLE 6

| Reported Value | Measured Quantity Value | Unit |
| --- | --- | --- |
| RSTD_0000 | −15391 > RSTD | $T_s$ |
| RSTD_0001 | −15391 ≤ RSTD < −15366 | $T_s$ |
| ... | ... | ... |
| RSTD_2258 | −4106 ≤ RSTD < −4101 | $T_s$ |
| RSTD_2259 | −4101 ≤ RSTD < −4096 | $T_s$ |
| RSTD_2260 | −4096 ≤ RSTD < −4095 | $T_s$ |
| RSTD_2261 | −4095 ≤ RSTD < −4094 | $T_s$ |
| ... | ... | ... |
| RSTD_6353 | −3 ≤ RSTD < −2 | $T_s$ |
| RSTD_6354 | −2 ≤ RSTD < −1 | $T_s$ |
| RSTD_6355 | −1 ≤ RSTD ≤ 0 | $T_s$ |
| RSTD_6356 | 0 < RSTD ≤ 1 | $T_s$ |
| RSTD_6357 | 1 < RSTD ≤ 2 | $T_s$ |
| RSTD_6358 | 2 < RSTD ≤ 3 | $T_s$ |
| ... | ... | ... |
| RSTD_10450 | 4094 < RSTD ≤ 4095 | $T_s$ |
| RSTD_10451 | 4095 < RSTD ≤ 4096 | $T_s$ |
| RSTD_10452 | 4096 < RSTD ≤ 4101 | $T_s$ |
| RSTD_10453 | 4101 < RSTD ≤ 4106 | $T_s$ |
| ... | ... | ... |
| RSTD_12709 | 15381 < RSTD ≤ 15386 | $T_s$ |
| RSTD_12710 | 15386 < RSTD ≤ 15391 | $T_s$ |
| RSTD_12711 | 15391 < RSTD | $T_s$ |

Table 7 below may be considered as an example of the second table (Table 9.1.10.4-1 of TS 36.133: Relative quantity mapping for higher-resolution RSTD measurement.

TABLE 7

| Reported Relative Quantity Value | Measured Relative Quantity Value, $\Delta_{RSTD}$ | Unit |
| --- | --- | --- |
| RSTD_delta_0 | 0 | $T_s$ |
| RSTD_delta_1 | 0.5 | $T_s$ |
| RSTD_delta_2 | 1.0 | $T_s$ |
| RSTD_delta_3 | 2.0 | $T_s$ |
| RSTD_delta_4 | 3.0 | $T_s$ |
| RSTD_delta_5 | 4.0 | $T_s$ |

In Tables 6 and 7, $T_s$ denotes a basic time unit and may mean a sampling time.

The first DL RS and second DL RS may be configured/indicated to the UE as an SSB/CSI-RS/PRS. However, even when the first DL RS and second DL RS are the same type of RS, the first DL RS may be an RS having a smaller signal bandwidth than the second RS. As an example, the first DL RS may be an SSB, and the second DL RS may be an SSB/CSI-RS/PRS configured to have a larger signal bandwidth than the first DL RS, SSB. As another example, the first DL RS may be a PRS, and the second DL RS may be a PRS configured to have a larger signal bandwidth than the first DL RS, PRS.

The first DL RS and second DL RS may be configured/indicated as the same type of RS. As an example, it may be considered that both the first DL RS and second DL RS are PRSs. As another example, it may be considered that both the first DL RS and second DL RS are SSBs/CSI-RSs. However, even when the first DL RS and second DL RS are the same type of DL RS, different RS resources may be configured/indicated so that the UE is capable of identifying measurements obtained based on the first DL RS and second DL RS.

For example, if the first DL RS is an SSB/CSI-RS and the second DL RS is a PRS, the UE may be configured/instructed to report UE measurement information obtained based on the first DL RS to the BS and report UE measurement information obtained based on the second DL RS to the LMF/location server. In this case, the BS may inform the LMF/location server of the reported first DL RS measurement information.

Effects

Considering that reporting of the RSTD measurement obtained based on the second DL RS is the final RSTD value reporting, the RSTD value ($RSTD_2$) obtained based on the second DL RS may be accurately reported to the LMF/location server/BS according to various embodiments of the present disclosure. That is, when the same number of quantization bits are used to report the same RSTD (for the same TP), the value of A is a numerical value representing the difference from the RSTD ($RSTD_1$) obtained based on the first DL RS and thus has a relatively small range, so that high-resolution reporting may be supported even with a small amount of information (e.g., a relatively small number of bits). Alternatively, the amount of information (e.g., the number of bits) required to provide the same RSTD reporting accuracy may be relatively small. Further, since the UE measures ToA/RSTD once based on the first DL RS, the UE may adjust a cross-correlation window and reduce computational complexity in the next measurement.

3.1.1. Proposal #1-1 (QCL-D Configuration)

The same spatial QCL may be always configured/indicated for the first DL RS and second DL RS. That is, QCL type D sources of the first DL RS and second DL RS may need to be set to the same RS resource (e.g., the same RS resource ID).

The reason for this is that since only the difference between the UE measurements obtained based on the first DL RS and second DL RS is reported, the UE may need to acquire the measurements for the first DL RS and second DL RS with the same reception (RX) beam. Otherwise, the measurement obtained based on the second DL RS may not be significantly related to the measurement obtained based on the first DL RS.

When different RS resource IDs are indicated/configured, different RS resources configured as QCL type D sources may need to be connected/configured with QCL type D sources for the same/specific RS resource ID. If the QCL type D sources for the first DL RS and second DL RS are not the same RS resource (that is, if the first DL RS and second DL RS are not configured based on the same spatial QCL), the UE may report the measurement information obtained based on the second DL RS (i.e., the measurement rather than the difference) rather than the difference from the measurement obtained based on the first DL RS. The above UE operation may be configured/instructed by the LMF/location server/BS.

For example, a QCL type D source (e.g., a specific RS resource ID, a specific RS resource index, etc.) for the first DL RS may not be configured. That is, a case in which the first DL RS is an SSB may be considered. In this case, if the first DL RS is a QCL type D source of the second DL RS, the same UE may receive the first DL RS and second DL RS on the same RX beam. Accordingly, such a case may be considered as a prerequisite for applying Proposal #1 according to various embodiments of the present disclosure.

In summary, Proposal #1 according to various embodiments of the present disclosure may be applied/used in the following three spatial QCL configuration conditions:

When the QCL type D sources of the first DL RS and second DL RS are configured/indicated as the same RS resource;

When the QCL type D sources the first DL RS and second DL RS are not the same but the fundamental QCL type D sources for QCL type D are the same; and For example, when the first DL RS is CSI-RS resource #1, and the second DL RS is PRS resource #1, the QCL type D source of CSI-RS resource #1 may be CSI-RS resource #2, and the QCL type D source of PRS resource #1 may be CSI-RS resource #3. In this case, the QCL type D sources of CSI-RS resource #2 and CSI-RS resource #3 may be SSB #1, that is, the QCL type D sources of CSI-RS resource #2 and CSI-RS resource #3 may be the same. In the above case, the fundamental QCL type D sources for QCL type D may be considered the same.

When the QCL source of the second DL RS is the first DL RS and the QCL type D source of the first DL RS is not configured.

3.1.2. Proposal #1-2 (Time Stamp)

The UE may be configured/instructed to report time stamp information that defines UE measurement associated with a time stamp to the LMF/location server/BS.

For example, the UE may be configured/instructed to report time stamp information about a time difference between the time when the UE obtains the measurement based on the first DL RS and the time when the UE obtains the measurement based on the second DL RS to the LMF/location server/BS.

Additionally/alternatively, the UE may be configured/instructed to report to the LMF/location server/BS information on one or more of the movement direction, movement speed, and acceleration of the UE during the above-described time difference, which are obtained by sensors mounted on the UE.

Additionally/alternatively, the UE may report to the LMF/location server/BS the validity/quality of information on the distance traveled by the UE during the time difference between the time when the UE obtains the measurement based on the first DL RS and the time when the UE obtains the measurement based on the second DL RS, which is calculated by the UE itself, and/or the time for which the reported information is valid.

When a difference between the measurement ($RSTD_1$) obtained based on the first DL RS ($RSTD_1$) and the measurement ($RSTD_2$) obtained based on the second DL RS is greater than or equal to a predetermined threshold, it may be more suitable to directly report the RSTD obtained based on the second DL RS than to report the difference A between $RSTD_1$ and $RSTD_2$. In this case, reporting $RSTD_2$ may be advantageous in terms of signaling overhead. For example, when it is necessary to ensure the temporal validity of the measurement obtained based on the first DL RS and when the value of A is reported to report the RSTD obtained based on the second DL RS to the LMF/location server/BS, the UE may need to be configured/instructed to report the time stamp to the LMF/location server/BS as well.

3.1.3. Proposal #1-3 (First DL RS Measurement Quality Reporting and/or Second DL RS Measurement Report Reconfiguration)

In Proposal #1 according to various embodiments of the present disclosure, even if the first DL RS is not a PRS, the UE may report the measurement quality of a measurement (e.g., TOA/TOF/RSTD/RX-TX time difference/RSRP, etc.) to be used for UE positioning, which is obtained by the UE based on the first DL RS. The above UE operation may be configured/instructed by the LMF/location server/BS.

The measurement quality may be absolute quality (or relative quality). The measurement quality may be expected errors when the UE location is estimated based on measurements (e.g., distance in meters, etc.) and/or class information such as A/B/C/D (A>B>C>D, where each of A, B, C, and D is an integer or real number). For example, the absolute quality may be a value representing (or corresponding/mapped to) the quality/reliability of a timing measurement. The relative quality may be the quality for a measured/obtained measurement, which may be other than the absolute quality corresponding to the absolute value of the quality of the measured/obtained measurement.

When the measurement obtained by receiving the second DL RS is reported, only the difference from the measurement obtained based on the first DL RS is reported, and thus, information on the quality of the first DL RS may be useful. As an extreme example, when the measurement quality of the measurement obtained based on the first DL RS is significantly lower than a predetermined threshold, it may be difficult to consider the measurement as a meaningful value. In this case, if the difference from the measurement obtained based on the first DL RS is reported to report the measurement obtained by receiving the second DL RS, the quality/reliability of the corresponding difference may also decrease. In this case, the LMF/location server/BS may configure/reconfigure/instruct the UE to report the RSTD obtained based on the PRS (e.g., the measurement itself obtained by receiving the second DL RS) when the UE intends to report the measurement obtained based on the second DL RS, instead of the difference from the measurement obtained based on the first DL RS as described in Proposal #1 according to various embodiments of the present disclosure.

3.1.4. Proposal #1-4 (Second DL RS Measurement Report Configuration)

As described in Proposal #1 according to various embodiments of the present disclosure, when the UE reports a measurement (to be used for UE positioning) obtained based on the first DL RS to the LMF/location server/BS, the UE may be configured/indicated with the range of reporting values for reporting a measurement obtained based on the second DL RS and/or resolution therefor from the LMF/location server/BS.

That is, the range of the reporting values for reporting the measurement obtained based on the second DL RS may be configured in advance, and only the resolution for measurement reporting values may be additionally configured/indicated. Additionally/alternatively, the reporting resolution for the range of the values for reporting the measurement obtained based on the second DL RS may be configured/instructed or configured/promised in advance, and only the entire range of the reporting values to be considered when reporting the measurement obtained based on the second DL RS may be configured/indicated. For example, since the range of the reporting values for reporting the measurement is configured in advance, the range may be kept/fixed to be the same. The resolution corresponding to reporting granularity may vary according to additional configurations/indications (for example, the higher the resolution, the lower the reporting granularity, and the lower the resolution, the higher the reporting granularity). Accordingly, the number of bits required for reporting may vary depending to a change in the resolution. For example, as the resolution decreases, the reporting granularity increases, and thus the number of required bits may increase. On the contrary, as the resolution increases, the reporting granularity decreases, and thus the number of required bits may decrease.

For example, depending on the reliability of the measurement obtained and/or reported based on the first DL RS, the LMF/location server/BS may need to change the range of the reporting values for the measurement obtained and reported by the UE based on the second DL RS. For example, when the location of the UE is estimated based on the measurement reported based on the first DL RS (i.e., the report on the measurement obtained based on the first DL RS) because the reliability is significantly higher than a predetermined threshold, if an error is within 10 m, the UE may be configured/instructed to report measurement information obtained based on the second DL RS (i.e., the report on the measurement obtained based on the second DL RS) with high resolution above a prescribed threshold within an error range of 10 m.

3.1.5. Proposal #1-5 (Fallback Mode Reporting)

As described in Proposal #1 according to various embodiments of the present disclosure, the UE may be configured/instructed to obtain and/or report measurements based on the first DL RS and second DL RS. In particular, as mentioned in Proposal #1 according to various embodiments of the present disclosure, the UE may report as measurement information obtained based on the second DL RS only a difference from the first DL RS measurement.

However, for measurement for UE positioning, the UE may need to not only receive an RS transmitted from a serving cell/TP/BS to which the UE belongs but also receive an RS transmitted from another (neighboring) cell/TP/BS. In this case, if the first DL RS and/or second DL RS is not the PRS, which is a RS dedicated to UE positioning, the UE may not properly receive an SSB/CSI-RS transmitted from the other cell. Accordingly, the following may be considered in various embodiments of the present disclosure:

When the UE properly receives the first DL RS (successfully receives the first DL RS) so that the UE is capable of obtaining the measurement and reporting the measurement information but the UE does not properly receive the second DL RS (does not successfully receiving the second DL RS or fails to receive the second DL RS) so that it is difficult for the UE to obtain and/or report an appropriate measurement, The UE may report the measurement obtained based on the first DL RS to the LMF/location server/BS and inform the LMF/location server/BS that the UE does not report the measurement for the second DL RS and/or fails to obtain the measurement (based on the second DL RS);

When the UE properly receives the second DL RS (successfully receives the second DL RS) so that the UE is capable of obtaining the measurement and reporting the measurement information but the UE does not properly receive the first DL RS (does not successfully receiving the first DL RS or fails to receive the first DL RS) so that it is difficult for the UE to obtain and/or report an appropriate measurement, The UE may report that the quality of the measurement is significantly lower than a predetermined threshold together with the measurement obtained based on the first DL RS. The UE may report the second DL RS measurement to the LMF/location server/BS regardless of reporting the second DL RS measurement (and the first DL RS measurement). For example, the UE may report the second DL RS measurement itself, instead of reporting the difference from the first DL RS measurement.

Additionally/alternatively, the UE may not report the measurement obtained based on the first DL RS. The UE may report the second DL RS measurement to the LMF/location server/BS, regardless of reporting the first DL RS measurement. The UE may report the second DL RS measurement itself, instead of reporting the difference from the first DL RS measurement.

It may be considered that when the UE intends to report the measurement obtained based on the first DL RS, the UE reports a (predetermined) meaningless value (e.g., trash value). However, it may be considered that the UE transmits a predetermined value and/or a specific default value to allow the LMF/location server/BS to recognize that the reported value is meaningless.

Figure 17:
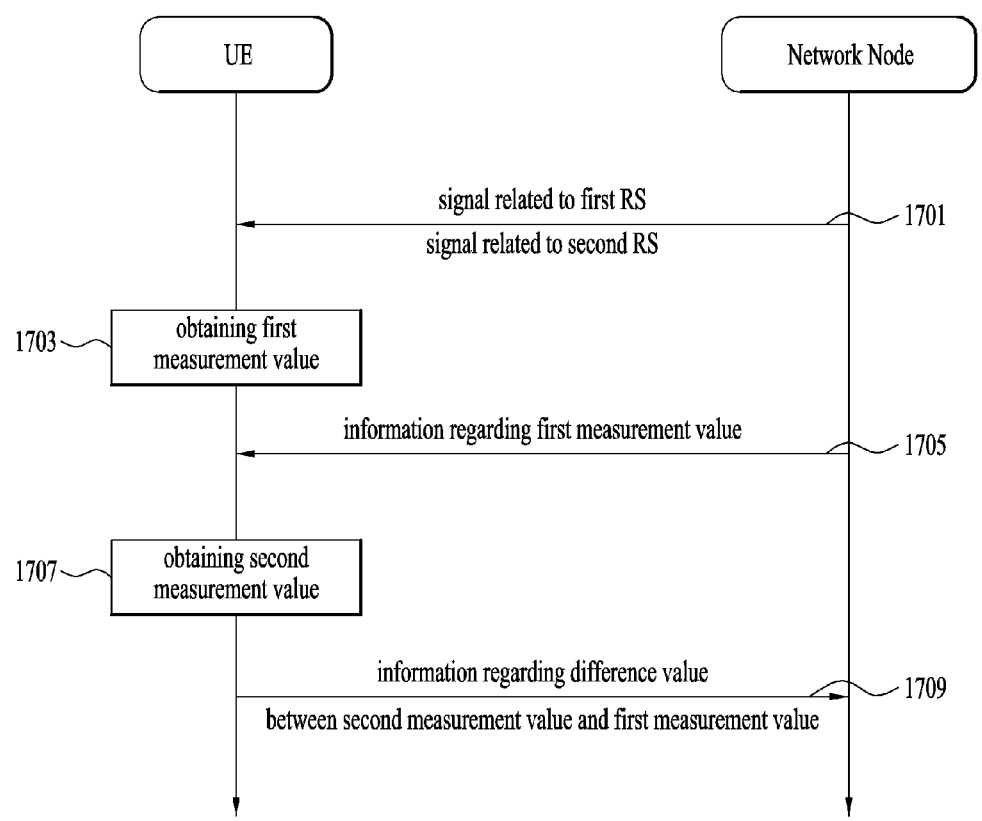
FIG. 17 is a diagram schematically illustrating an operation method for a UE and a network node according to various embodiments of the present disclosure.

FIG. 17 is a diagram schematically illustrating an operation method for a UE and a network node according to various embodiments of the present disclosure.

Figure 18:
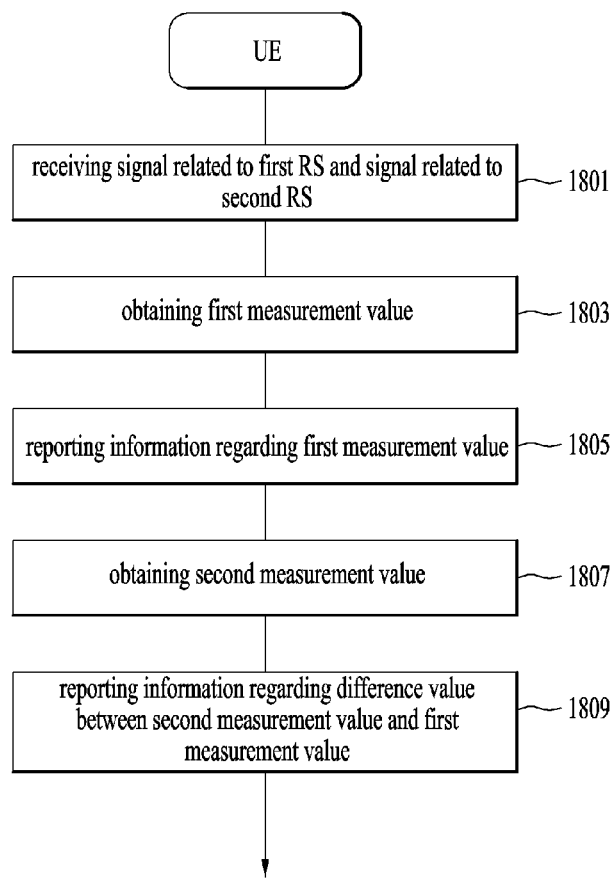
FIG. 18 is a flowchart illustrating an operation method for a UE according to various embodiments of the present disclosure.

FIG. 18 is a flowchart illustrating an operation method for a UE according to various embodiments of the present disclosure.

Figure 19:
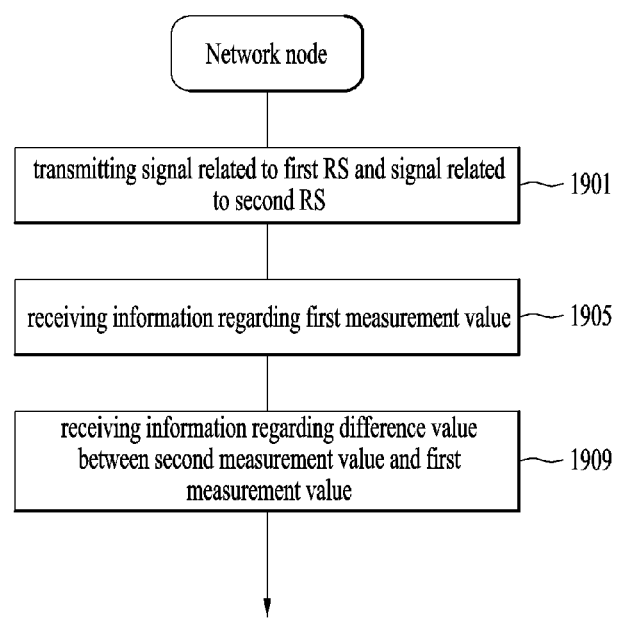
FIG. 19 is a flowchart illustrating an operation method for a network node according to various embodiments of the present disclosure.

FIG. 19 is a flowchart illustrating an operation method for a network node according to various embodiments of the present disclosure. For example, the network node may be a location server, an LMF, a TP, and/or any device performing the same work.

Referring to FIGS. 17 to 19, in operations 1701, 1801, and 1901 according to exemplary embodiments, the network node may transmit a signal related to a first RS and a signal related to a second RS, and the UE may receive the signals. Each of the first and second RSs may be a DL RS. For example, when the network node is a location server and/or LMF and when the RS is a PRS, each of the signal related to the first RS and the signal related to the second RS may include information related to a PRS configuration. For example, when the network node is a TP and the RS is a PRS, each of the signal related to the first RS and the signal related to the second RS may be a PRS. When the first RS is an SSB and the second RS is a PRS, the SSB and PRS may be transmitted from the TP. When the network node is a location server and/or LMF, and the RS is an SSB, operations 1701, 1801, and 1901 according to the exemplary embodiments may be omitted.

In operations 1703 and 1803 according to exemplary embodiments, the UE may obtain a first measurement for positioning based on the first RS.

In operations 1705, 1805, and 1905 according to exemplary embodiments, the UE may transmit/report information on the first measurement, and the network node may receive the information.

In operations 1707 and 1807 according to exemplary embodiments, the UE may obtain a second measurement for positioning based on the second RS.

In operations 1709, 1809, and 1909 according to exemplary embodiments, the UE may transmit/report information on a difference between the second and first measurements.

The difference may be greater than or equal to 0. For example, the difference may be the absolute value of the difference between the second and first measurements. Additionally/alternatively, the difference may be greater than or equal to 0 in consideration of the magnitude relationship between the second and first measurements (for example, the first measurement may be the minimum of reported values, and thus, the second measurement may be greater than or equal to the first measurement).

More specific operations of the UE and/or the TP and/or the location server according to the above-described various embodiments of the present disclosure may be described and performed based on the descriptions of clause 1 to clause 3.

Examples of the above-described proposed methods may also be included as one of various embodiments of the present disclosure, and thus may be considered to be some proposed methods. While the proposed methods may be independently implemented, some of the proposed methods may be combined (or merged). It may be regulated that information indicating whether to apply the proposed methods (or information about the rules of the proposed methods) is indicated by a signal (e.g., a physical-layer signal or a higher-layer signal) predefined for the UE by the BS.

4. Exemplary Configurations of Devices Implementing Various Embodiments of the Present Disclosure

4.1. Exemplary Configurations of Devices to which Various Embodiments of the Present Disclosure are Applied FIG. 20 is a diagram illustrating devices that implement various embodiments of the present disclosure.

Figure 20:
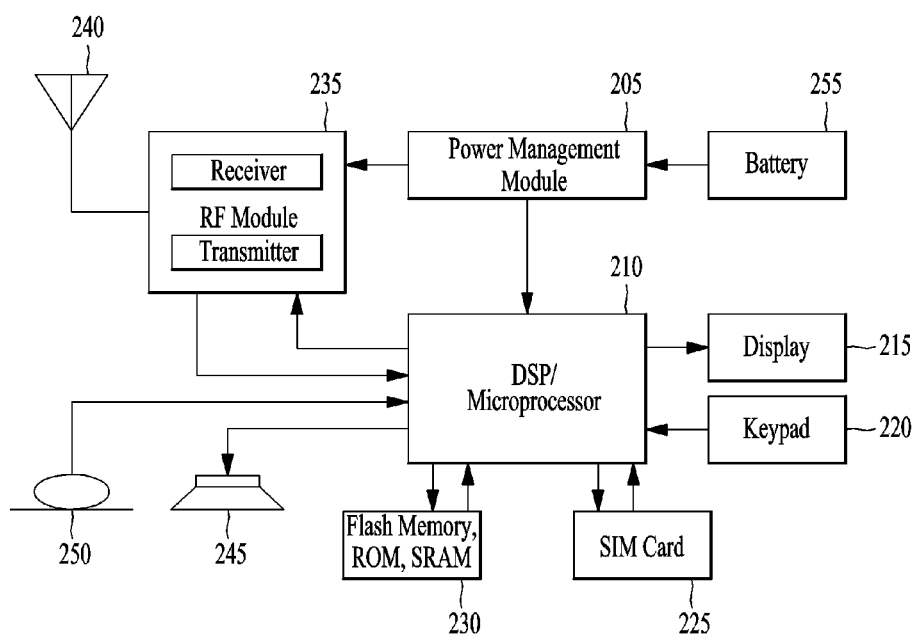
FIG. 20 is a diagram illustrating devices that implement various embodiments of the present disclosure.

The devices illustrated in FIG. 20 may be a UE and/or a BS (e.g., eNB or gNB) adapted to perform the aforedescribed mechanisms, or any devices performing the same operation.

Referring to FIG. 20, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 20 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 20 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor included in a UE (or a communication device included in the UE) and a BE (or a communication device included in the BS) according to various embodiments of the present disclosure may operate as follows, while controlling a memory.

According to various embodiments of the present disclosure, a UE or a BS may include at least one transceiver, at least one memory, and at least one processor coupled to the at least one transceiver and the at least one memory. The at least one memory may store instructions causing the at least one processor to perform the following operations.

A communication device included in the UE or the BS may be configured to include the at least one processor and the at least one memory. The communication device may be configured to include the at least one transceiver, or may be configured not to include the at least one transceiver but to be connected to the at least one transceiver.

A location server, an LMF, a BS, a TP, and/or any device performing the same work may be referred to as a network node.

According to various embodiments of the present disclosure, one or more processors included in the UE (or one or more processors of the communication device included in the UE) may receive a first DL RS and a second DL RS.

According to various embodiments of the present disclosure, the one or more processors included in the UE may obtain a first measurement related to positioning based on the first DL RS.

According to various embodiments of the present disclosure, the one or more processors included in the UE may report information on the first measurement.

According to various embodiments of the present disclosure, the one or more processors included in the UE may obtain a second measurement related to the positioning based on the second DL RS.

According to various embodiments of the present disclosure, the one or more processors included in the UE may report information on a difference between the second measurement and the first measurement.

For example, the difference may be greater than or equal to 0. The difference may be an absolute value of the difference between the second measurement and the first measurement.

According to various embodiments of the present disclosure, one or more processors included in the network node (or one or more processors of the communication device included in the network node) may transmit a signal related to a first DL RS and a signal related to a second DL RS.

According to various embodiments of the present disclosure, the one or more processors included in the network node may receive information on a first measurement related to positioning corresponding to the first DL RS.

According to various embodiments of the present disclosure, the one or more processors included in the network node may receive information on a difference between the first measurement and a second measurement related to the positioning corresponding to the second DL RS.

For example, the difference may be greater than or equal to 0. The difference may be the absolute value of the difference between the second measurement and the first measurement. Additionally/alternatively, the difference may be greater than or equal to 0 in consideration of the magnitude relationship between the second measurement and the first measurement (for example, the first measurement may be the minimum of reported values, and thus, the second measurement may be greater than or equal to the first measurement).

More specific operations of the processor included in the UE and/or the BS and/or the location server according to the above-described various embodiments of the present disclosure may be described and performed based on the descriptions of clause 1 to clause 3.

Unless contradicting each other, various embodiments of the present disclosure may be implemented in combination. For example, (a processor or the like included in) a UE and/or a BS and/or a location server according to various embodiments of the present disclosure may implement the embodiments described in clause 1 to clause 3 in combination, unless contradicting each other.

4.2. Example of Communication System to which Various Embodiments of the Present Disclosure are Applied In the present specification, various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
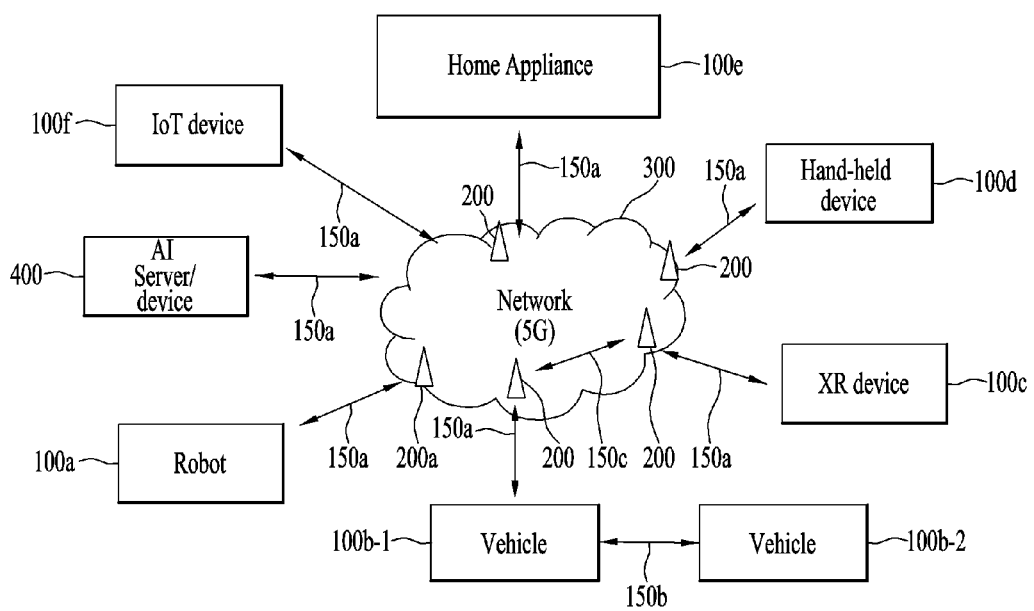
FIG. 21 illustrates an exemplary communication system to which various embodiments of the present disclosure are applied.

FIG. 21 illustrates an exemplary communication system to which various embodiments of the present disclosure are applied.

Referring to FIG. 21, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 22:
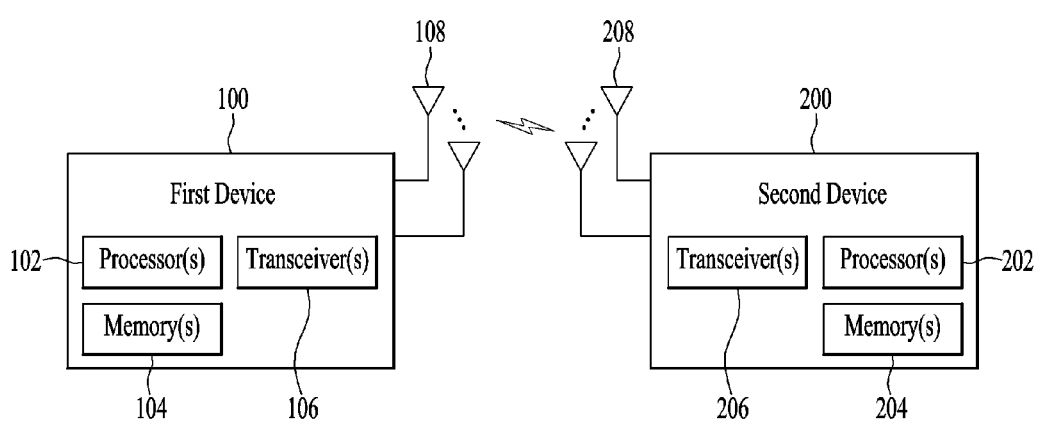
FIG. 22 illustrates exemplary wireless devices to which various embodiments of the present disclosure are applicable.

4.2.1 Example of Wireless Devices to which Various Embodiments of the Present Disclosure are Applied FIG. 22 illustrates exemplary wireless devices to which various embodiments of the present disclosure are applicable.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 23:
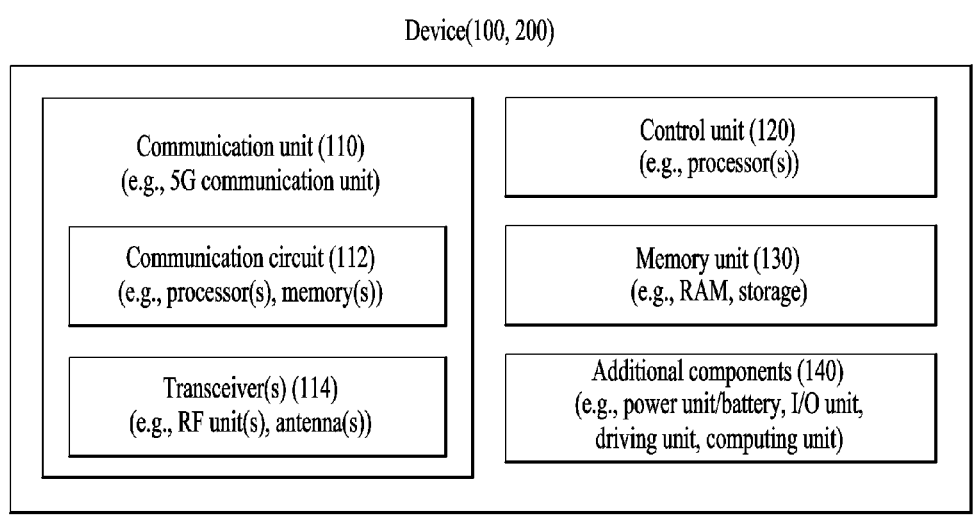
FIG. 23 illustrates other exemplary wireless devices to which various embodiments of the present disclosure are applied.

4.2.2. Example of Using Wireless Devices to which Various Embodiments of the Present Disclosure are Applied FIG. 23 illustrates other exemplary wireless devices to which various embodiments of the present disclosure are applied. The wireless devices may be implemented in various forms according to a use case/service (see FIG. 21).

Referring to FIG. 23, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 21), the vehicles (100b-1 and 100b-2 of FIG. 21), the XR device (100c of FIG. 21), the hand-held device (100d of FIG. 21), the home appliance (100e of FIG. 21), the IoT device (100f of FIG. 21), a digital broadcast terminal, a hologram device, a public safety device, an MTC device, a medicine device, a Fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Figure 24:
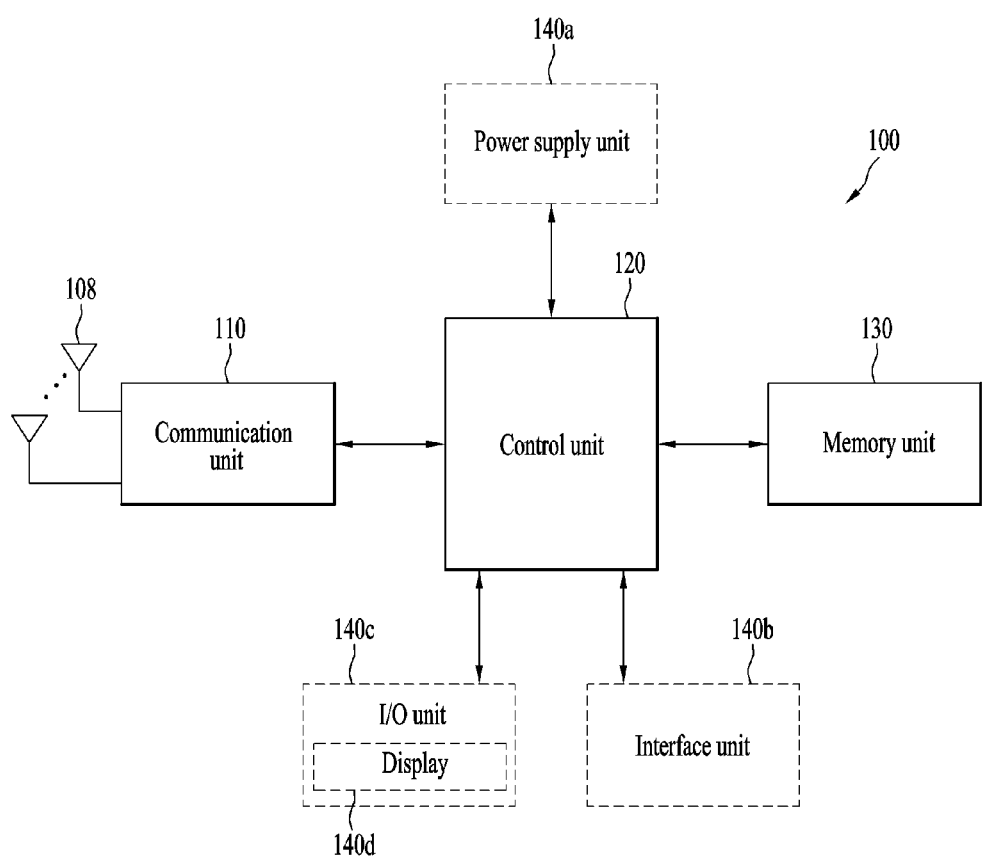
FIG. 24 illustrates an exemplary portable device to which various embodiments of the present disclosure are applied.

4.2.3. Example of Portable Device to which Various Embodiments of the Present Disclosure are Applied FIG. 24 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 25:
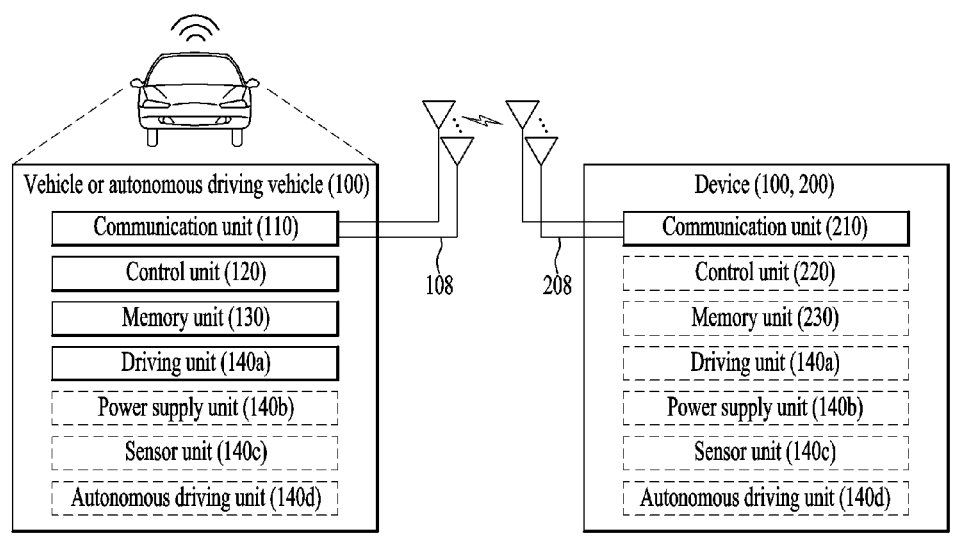
FIG. 25 illustrates an exemplary vehicle or autonomous driving vehicle to which various embodiments of the present disclosure.

4.2.4. Example of Vehicle or Autonomous Driving Vehicle to which Various Embodiments of the Present Disclosure FIG. 25 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 25, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi-mode multi-band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

Wireless communication technologies in which various embodiments of the present disclosure are implemented may include narrowband Internet of things for low-power communication as well as LTE, NR, and 6G. For example, the NB-IoT technology may be an example of low-power wide-area network (LPWAN) technologies and implemented in standards such as LTE Cat NB1 and/or LTE Cat NB2. However, the NB-IoT technology is not limited to the above names. Additionally or alternatively, the wireless communication technology implemented in the wireless devices according to various embodiments of the present disclosure may perform communication based on the LTE-M technology. For example, the LTE-M technology may be an example of LPWAN technologies and called by various names including enhanced machine type communication (eMTC). For example, the LTE-M technology may be implemented in at least one of the following various standards: 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, etc., but the LTE-M technology is not limited to the above names. Additionally or alternatively, the wireless communication technology implemented in the wireless devices according to various embodiments of the present disclosure may include at least one of ZigBee, Bluetooth, and LPWAN in consideration of low-power communication, but the wireless communication technology is not limited to the above names. For example, the ZigBee technology may create a personal area network (PAN) related to small/low-power digital communication based on various standards such as IEEE 802.15.4 and so on, and the ZigBee technology may be called by various names.

Various embodiments of the present disclosure may be implemented in various means. For example, various embodiments of the present disclosure may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The various embodiments of present disclosure are applicable to various wireless access systems including a 3GPP system, and/or a 3GPP2 system. Besides these wireless access systems, the various embodiments of the present disclosure are applicable to all technical fields in which the wireless access systems find their applications. Moreover, the proposed method can also be applied to mmWave communication using an ultra-high frequency band.

What is claimed is:

1. A method performed by a user equipment (UE) in a wireless communication system, the method comprising:
   receiving a first downlink (DL) reference signal (RS) and a second DL RS;
   obtaining a first measurement related to positioning based on the first DL RS, wherein the first measurement is for relative time difference between transmission points based on the first DL RS;
   reporting information on the first measurement;
   obtaining a second measurement related to the positioning based on the second DL RS, wherein the second measurement is for relative time difference between transmission points based on the second DL RS; and
   reporting information on a difference between the second measurement and the first measurement,
   wherein the difference is greater than or equal to 0.

2. The method of claim 1, wherein the first DL RS and the second DL RS are received based on one or more RS resources with same quasi co-location (QCL) type D among different RS resources.

3. The method of claim 1, further comprising reporting information on a time stamp, wherein the information on the time stamp is related to the first measurement and the second measurement.

4. The method of claim 3, wherein the information on the time stamp includes information on a difference between a time at which the first measurement is obtained and a time at which the second measurement is obtained.

5. The method of claim 1, wherein the first DL RS is a synchronization signal block (SSB), a channel state information reference signal (CSI-RS), or a positioning reference signal (PRS), and wherein the second DL RS is a PRS.

6. The method of claim 1, wherein reporting the information on the difference comprises reporting information on the difference based on reception of information configured to report the difference between the second measurement and the first measurement.

7. The method of claim 1, further comprising receiving information on resolution for reporting measurements related to the positioning.

8. The method of claim 7, wherein the information on the difference is reported based on the resolution.

9. An apparatus configured to operate in a wireless communication system, the apparatus comprising:
a memory; and
one or more processors connected to the memory,
wherein the one or more processors are configured to:
receive a first downlink (DL) reference signal (RS) and a second DL RS;
obtain a first measurement related to positioning based on the first DL RS, wherein the first measurement is for relative time difference between transmission points based on the first DL RS;
report information on the first measurement;
obtain a second measurement related to the positioning based on the second DL RS, wherein the second measurement is for relative time difference between transmission points based on the second DL RS; and
report information on a difference between the second measurement and the first measurement, and
wherein the difference is greater than or equal to 0.

10. The apparatus of claim 9, wherein the apparatus communicates with at least one of a mobile terminal, a network, or an autonomous driving vehicle other than a vehicle including the apparatus.

11. A method performed by a network node in a wireless communication system, the method comprising:
transmitting a signal related to a first downlink (DL) reference signal (RS) and a signal related to a second DL RS;
receiving information on a first measurement related to positioning corresponding to based on the first DL RS, wherein the first measurement is for relative time difference between transmission points based on the first DL RS; and
receiving information on a difference between the first measurement and a second measurement related to the positioning based on the second DL RS, wherein the second measurement is for relative time difference between transmission points based on the second DL RS,
wherein the difference is greater than or equal to 0.

12. An apparatus configured to operate in a wireless communication system, the apparatus comprising:
a memory; and
one or more processors connected to the memory,
wherein the one or more processors are configured to:
transmit a signal related to a first downlink (DL) reference signal (RS) and a signal related to a second DL RS;
receive information on a first measurement related to positioning corresponding to based on the first DL RS, wherein the first measurement is for relative time difference between transmission points based on the first DL RS; and
receive information on a difference between the first measurement and a second measurement related to the positioning based on the second DL RS, wherein the second measurement is for relative time difference between transmission points based on the second DL RS,
wherein the difference is greater than or equal to 0.

* * * * *